(12) United States Patent
Fujiki

(10) Patent No.: US 11,528,260 B2
(45) Date of Patent: Dec. 13, 2022

(54) TRANSMITTING DEVICE AND TRANSMITTING METHOD, AND RECEIVING DEVICE AND RECEIVING METHOD

(71) Applicant: Sony Semiconductor Solutions Corporation, Kanagawa (JP)

(72) Inventor: Toshihiro Fujiki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 92 days.

(21) Appl. No.: 17/265,820

(22) PCT Filed: Sep. 6, 2019

(86) PCT No.: PCT/JP2019/035150
§ 371 (c)(1),
(2) Date: Feb. 4, 2021

(87) PCT Pub. No.: WO2020/059535
PCT Pub. Date: Mar. 26, 2020

(65) Prior Publication Data
US 2021/0314307 A1    Oct. 7, 2021

(30) Foreign Application Priority Data

Sep. 20, 2018  (JP) .............................. JP2018-176527
Sep. 28, 2018  (JP) .............................. JP2018-184021

(51) Int. Cl.
*H04L 29/04*      (2006.01)
*G06F 21/00*      (2013.01)
(Continued)

(52) U.S. Cl.
CPC .......... *H04L 63/0457* (2013.01); *G16Y 10/75* (2020.01); *G16Y 30/10* (2020.01);
(Continued)

(58) Field of Classification Search
None
See application file for complete search history.

(56) References Cited

U.S. PATENT DOCUMENTS 5,812,661 A  *  9/1998  Akiyama ................. G06F 21/10
                                                    705/52
6,104,748 A  *  8/2000  Kaku ....................... H04B 1/707
                                                    375/340
(Continued)

FOREIGN PATENT DOCUMENTS

EP    2215795 B1    12/2016
JP    8-54953 A     2/1996
(Continued)

OTHER PUBLICATIONS

Sutton:"Electronic protection measures frequency hopping",Secure Communications: Applications and Management, Wiley, US,Jan. 1, 2002 (Jan. 1, 2002), pp. 171-209, XP002336927,section 7.2.1 *.

(Continued)

*Primary Examiner* — Lisa C Lewis
(74) *Attorney, Agent, or Firm* — Xsensus LLP

(57) ABSTRACT

The present disclosure relates to a transmitting device and a transmitting method, and a receiving device and a receiving method which are capable of improving confidentiality and communication resistance in low power wide area (LPWA) communication.

The transmitting device generates a key stream on the basis of GPS time information, encrypts transmitted data on the basis of the key stream to generate encrypted data, and transmits the encrypted data to the receiving device. The receiving device generates a key stream on the basis of GPS time information and decodes the encrypted data into the (Continued)

transmitted data on the basis of the key stream. The present disclosure can be applied to an LPWA communication system.

18 Claims, 17 Drawing Sheets

(51) Int. Cl.
*H04L 9/40* (2022.01)
*G16Y 30/10* (2020.01)
*G16Y 10/75* (2020.01)
*H04L 9/06* (2006.01)
*H04L 9/32* (2006.01)
*G04R 20/02* (2013.01)

(52) U.S. Cl.
CPC ............ *H04L 9/065* (2013.01); *H04L 9/3242* (2013.01); *G04R 20/02* (2013.01)

(56) References Cited

U.S. PATENT DOCUMENTS

| | | | | |
|---|---|---|---|---|
| 6,321,094 | B1* | 11/2001 | Hayashi | H04L 9/3271 455/410 |
| 8,582,762 | B2* | 11/2013 | Holtmanns | H04L 9/0861 713/171 |
| 9,263,052 | B1* | 2/2016 | Talkin | G10L 19/04 |
| 11,228,421 | B1* | 1/2022 | Mesh | G06F 21/36 |
| 2003/0061500 | A1* | 3/2003 | Mimura | G11B 20/00246 713/193 |
| 2006/0206709 | A1* | 9/2006 | Labrou | G06Q 20/18 713/167 |
| 2006/0265595 | A1* | 11/2006 | Scottodiluzio | H04L 9/3247 713/180 |
| 2007/0022058 | A1* | 1/2007 | Labrou | G06Q 20/322 705/67 |
| 2007/0172067 | A1* | 7/2007 | Otal | H04N 21/26613 348/E7.056 |
| 2012/0087496 | A1* | 4/2012 | Lo | H04N 21/4408 348/14.02 |
| 2014/0072025 | A1* | 3/2014 | Matsudaira | H04B 5/0075 375/232 |
| 2014/0226813 | A1* | 8/2014 | Heffner | H04L 63/0435 380/44 |
| 2015/0156184 | A1* | 6/2015 | Tucker | H04L 63/0876 713/168 |
| 2016/0210185 | A1* | 7/2016 | Popescu | H04L 1/0079 |
| 2018/0191398 | A1* | 7/2018 | Kobayashi | H04B 1/715 |
| 2018/0359811 | A1* | 12/2018 | Verzun | H04W 28/12 |
| 2019/0147170 | A1* | 5/2019 | Keselman | H04L 9/0869 713/189 |
| 2020/0028676 | A1* | 1/2020 | Murakami | H04L 9/0891 |

FOREIGN PATENT DOCUMENTS

| | | |
|---|---|---|
| JP | 8-79236 A | 3/1996 |
| JP | 9-8699 A | 1/1997 |
| JP | 10-215488 A | 8/1998 |
| JP | 2000-209196 A | 7/2000 |
| JP | 2014-99793 A | 5/2014 |
| JP | 6259550 B1 | 1/2018 |
| WO | 2012/090448 A1 | 7/2012 |

OTHER PUBLICATIONS

Yang Xueying et al: "Security Vulnerabilities in LoRaWAN", 2018 IEEE/ACM Third International Conference on Internet-of-Things Design and Implementation (IOTDI), IEEE, Apr. 17, 2018 (Apr. 17, 2018), pp. 129-140, XP033350844, DOI: 10.1109/IOTDI .2018. 00022 [retrieved on May 25, 2018]section III.C;figures 2.3 *.
International Search Report and Written Opinion dated Nov. 26, 2019, received for PCT Application PCT/JP2019/035150, Filed on Sep. 6, 2019, 11 pages including English Translation.

* cited by examiner

TRANSMITTING DEVICE AND TRANSMITTING METHOD, AND RECEIVING DEVICE AND RECEIVING METHOD

CROSS-REFERENCE TO RELATED APPLICATIONS

The present application is based on PCT filing PCT/JP2019/035150, filed Sep. 6, 2019, which claims priority to JP 2018-176527, filed on Sep. 20, 2018, and JP 2018-184021, filed on Sep. 28, 2018, the entire contents of each are incorporated herein by reference.

TECHNICAL FIELD

The present disclosure relates to a transmitting device and a transmitting method, and a receiving device and a receiving method, and particularly to a transmitting device and a transmitting method, and a receiving device and a receiving method which are capable of improving confidentiality and communication resistance in low power wide area (LPWA) communication.

BACKGROUND ART

A communication technology using low power wide area (LPWA) communication has been proposed (see Patent Document 1).

The LPWA communication is a communication which transmits and receives a small amount of Payload data (around 100 bits) at a low bit rate from an IoT terminal (transmitting device) to an IoT gateway (receiving device) in one direction, and thus, communication with low power consumption can be realized in an IoT terminal (transmitter) of performing LPWA communication.

CITATION LIST

Patent Document

Patent Document 1: Japanese Patent No. 6259550

SUMMARY OF THE INVENTION

Problems to be Solved by the Invention

However, in the above-described LPWA communication, when an encryption method using arithmetic processing for solving a complicated mathematical problem is used in order to realize a high degree of security, the processing load increases in an IoT terminal which requires low power consumption, and the power consumption increases.

Furthermore, from the viewpoint of multi-layer defense, it is possible to further improve confidentiality when encryption in a physical layer is introduced to be combined with encryption processing in the layer above the physical layer.

In particular, in wireless, a method of improving a demodulation ability by using a waveform synthesis method (such as maximum ratio synthesis and selective synthesis) in the physical layer is used.

In this case, in order to synthesize the waveform, it is necessary to have the same wireless waveform or a waveform that can be easily converted into the same waveform.

In a case where the same wireless waveform is used, a replay (replay) attack which attacks an IoT gateway (receiving device) by capturing and retransmitting the wireless waveform is possible, and thus it is necessary to take measures against the replay (replay) attack.

Moreover, in a format configured by only linear codes, it is necessary to take measures against tampering by bit inversion and the like, and measures or the like by a cipher-based message authentication code (Cihper-based MAC: CMAC) are generally adopted.

However, in a case where a waveform synthesis technique of improves wireless demodulation/decoding performance is used, it is not possible to adopt a method of dealing with replay attacks by changing the CMAC value at every transmission.

The present disclosure has been made in view of such a situation, and in particular, it is intended to improve the confidentiality and communication resistance in LPWA communication.

Solutions to Problems

A transmitting device of a first aspect of the present disclosure includes: a key stream generation unit that generates a key stream by using information different depending on a timing as an initial value; an encryption unit that converts transmitted data into encrypted data by using the key stream; and a transmission unit that transmits a waveform signal obtained by modulating the encrypted data.

A transmitting method of the first aspect of the present disclosure corresponds to the configuration of the transmitting device.

In the first aspect of the present disclosure, a key stream is generated by using information different depending on a timing as an initial value, transmitted data is converted into encrypted data by using the key stream, and a waveform signal obtained by modulating the encrypted data is transmitted.

A receiving device of a second aspect of the present disclosure includes: a reception unit that receives a waveform signal which is transmitted from a transmitting device and is obtained by modulating encrypted data obtained by encrypting transmitted data by a key stream generated by using information different depending on a timing as an initial value; a key stream generation unit that generates a key stream by using the information different depending on the timing as an initial value; a polarity inversion unit that inverts a polarity of a waveform of the waveform signal by the key stream; and a decoding unit that decodes the transmitted data on the basis of a waveform signal with the polarity inverted.

A receiving method of the second aspect of the present disclosure corresponds to the configuration of the receiving device.

In the second aspect of the present disclosure, a waveform signal is received which is transmitted from a transmitting device and is obtained by modulating encrypted data obtained by encrypting transmitted data by a key stream generated by using information different depending on a timing as an initial value, a key stream is generated by using the information different depending on the timing as an initial value, a polarity of a waveform of the waveform signal is inverted by the key stream, and the transmitted data is decoded on the basis of a waveform signal with the polarity inverted.

MODE FOR CARRYING OUT THE INVENTION

Figure 1:
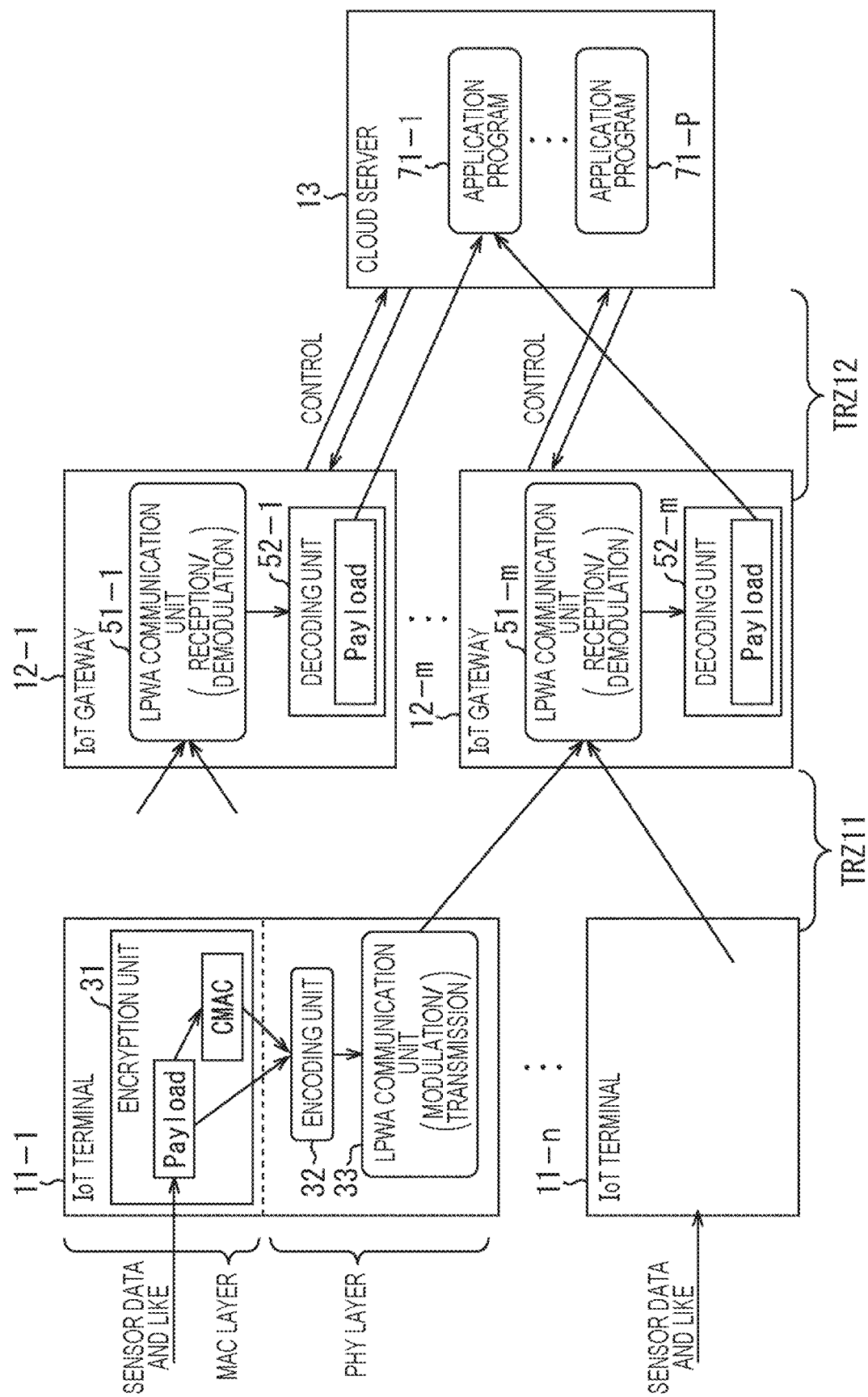
FIG. 1 is a diagram illustrating an overview of a one-way communication system using LPWA communication.

A preferred embodiment of the present disclosure will be described in detail below with reference to the accompanying drawings. Note that in the present specification and the drawings, components having substantially the same functional configuration are designated by the same reference numerals to omit duplicate description.

Hereinafter, modes for carrying out the present technology will be described. The description will be given in the following order.

1. Overview of communication system using LPWA communication
2. Embodiment of the present disclosure
3. Application example
4. Example of execution by software <<1. Overview of One-Way Communication System Using LPWA Communication>>

An overview of a one-way communication system using low power wide area (LPWA) communication will be described with reference to FIG. 1.

A communication system 1 using LPWA communication in FIG. 1 is configured by Internet of Things (IoT) terminals 11-1 to 11-$n$, IoT gateways 12-1 to 12-$m$, and a cloud server 13.

Note that the IoT terminals 11-1 to 11-$n$ and the IoT gateways 12-1 to 12-$m$ are simply referred to as an IoT terminal 11 and an IoT gateway 12 in a case where the IoT terminals and the IoT gateways do not need to be distinguished from each other, and other configurations are also referred similarly.

The IoT terminal 11 is arranged together with various unillustrated sensors provided in various environments or is possessed by a predetermined user and the like. The IoT terminal acquires the sensor data detected by sensors (not illustrated) in each environment and transmits the sensor data to the cloud server 13 via the IoT gateway 12.

The operation of the IoT gateway 12 is controlled by the cloud server 13, and the sensor data transmitted from the IoT terminal 11 is relayed and transmitted to the cloud server 13.

The cloud server 13 controls the operation of the IoT gateway 12, receives the sensor data transmitted from the IoT terminal 11 via the IoT gateway 12, and executes various application programs according to the received sensor data.

In the IoT terminal 11 and the IoT gateway 12, sensor data is transmitted by LPWA communication. In LPWA communication, sensor data is transmitted in one direction from the IoT terminal 11 to the IoT gateway 12.

As described above, the IoT terminal 11 only needs to transmit sensor data as a small amount of Payload data in one direction to the IoT gateway 12, and thus communication with low power consumption can be realized.

More specifically, the IoT terminal 11 includes an encryption unit 31, an encoding unit 32, and an LPWA communication unit 33.

In the IoT terminal 11, when transmitting sensor data, the encryption unit 31 configures a media access control (MAC) layer, and the encoding unit 32 and the LPWA communication unit 33 configure a physical (PHY) layer.

The encryption unit 31 generates a Payload of the transmission data sequence on the basis of the sensor data, further performs cipher-based message authentication code (Cihper-based MAC: CMAC) processing on the basis of the Payload to generate a CMAC tag for verifying tampering, and outputs the Payload and the CMAC tag to the encoding unit 32.

The encoding unit 32 creates a plaintext data bit sequence in which an error detection/correction code is added to the Payload and the CMAC tag, then converts the plaintext data bit sequence into an encrypted data bit sequence, and transmits the encrypted data bit sequence to the LPWA communication unit 33.

The LPWA communication unit 33 modulates the encrypted data bit sequence of the sensor data to generate a transmission frame waveform and transmits the transmission frame waveform to the IoT gateway 12 by LPWA communication.

The IoT gateway 12 includes an LPWA communication unit 51 and a decoding unit 52. In the IoT gateway 12, when receiving the transmission frame waveform configured from the sensor data, the LPWA communication unit 51 configures the physical (PHY) layer, and the decoding unit 52 configures the MAC layer.

The LPWA communication unit 51 receives the transmission frame waveform transmitted by LPWA communication, demodulates the transmission frame waveform as a waveform signal of the encrypted data bit sequence of the sensor data transmitted from the IoT terminal 11, and outputs the waveform signal to the decoding unit 52.

The decoding unit 52 decodes the waveform signal of the encrypted data bit sequence into a stream decoded data bit sequence including the Payload and the CMAC tag configured from the sensor data, obtains the CMAC tag from the Payload, determines whether or not the Payload has been tampered on the basis of the comparison with the transmitted CMAC tag, and transmits the sensor data of the Payload together with the determination result to the cloud server 13.

The cloud server 13 controls the operation of the IoT gateway 12 and executes various application programs 71-1 to 71-*p* on the basis of the sensor data transmitted from the IoT terminal 11 via the IoT gateway 12.

Note that in FIG. 1, an aspect is realized in which the application program 71-1 in the cloud server 13 operates on the basis of the sensor data transmitted from the IoT terminal 11 via the IoT gateway 12, but other application programs 71 also function in a similar manner.

Here, in the communication system 1 of FIG. 1, the communication TRZ11 between the IoT terminal 11 and the IoT gateway 12 is LPWA communication, and only one direction (one-way) communication in which the transmission frame waveform is transmitted from the IoT terminal 11 to the IoT gateway 12. For this reason, the communication TRZ11 between the IoT terminal 11 and the IoT gateway 12 cannot be confirmed by, for example, challenge and response authentication or the like since mutual communication is not possible, and thus measures against eavesdropping and tampering are required.

On the other hand, the communication TRZ12 between the IoT gateway 12 and the cloud server 13 is communication capable of two-way communication, and thus it is considered that stronger security can be realized compared with the communication TRZ11.

Next, the operation of the communication system 1 of FIG. 1 will be described.

The encryption unit 31 of the IoT terminal 11 acquires the sensor data detected from a sensor (not illustrated), generates a Payload corresponding to the sensor data, performs CAMC processing on the basis of the Payload, generates a CMAC tag, and outputs the Payload and the CAMC tag to the encoding unit 32.

The encoding unit 32 converts a plaintext data bit sequence in which an error detection/correction code is added to the Payload and the CAMC tag into an encrypted data bit sequence, and outputs the encrypted data bit sequence to the LPWA communication unit 33.

The LPWA communication unit 33 generates a transmission frame waveform signal by modulating the encrypted data bit sequence and transmits the transmission frame waveform signal to the IoT gateway 12 by LPWA communication.

The LPWA communication unit 51 of the IoT gateway 12 receives the transmission frame waveform signal transmitted by LPWA communication, demodulates the encrypted data bit sequence of the sensor data transmitted from the IoT terminal 11 on the basis of the received transmission frame waveform signal, and outputs the encrypted data bit sequence to the decoding unit 52.

The decoding unit 52 decodes the Payload and the CMAC tag configured from the sensor data from the encrypted data bit sequence, obtains the CMAC tag from the Payload, determines whether or not the Payload has been tampered on the basis of the comparison with the transmitted CMAC tag, and transmits the sensor data of the Payload together with the determination result to the cloud server 13.

The cloud server 13 controls the operation of the IoT gateway 12 and executes various application programs 71-1 to 71-*p* on the basis of the sensor data transmitted from the IoT terminal 11 via the IoT gateway 12.

Through the above series of operations, the sensor data detected by the sensor (not illustrated) is transmitted from the IoT terminal 11 to the cloud server 13 via the IoT gateway 12, and the application program 71 managed by the cloud server 13 can be executed. At this time, the IoT terminal 11 can transmit the sensor data to the IoT gateway by one-way communication by LPWA communication, and thus it is possible to realize communication with low power consumption.

<Method of Converting Plaintext Data Bit Sequence Including Payload and CMAC Tag of Sensor Data into Encrypted Data Bit Sequence>

Next, a method of converting the plaintext data bit sequence including the Payload and the CMAC tag of the sensor data into the encrypted data bit sequence by the encoding unit 32 of FIG. 1 will be described with reference to FIG. 2.

Figure 2:
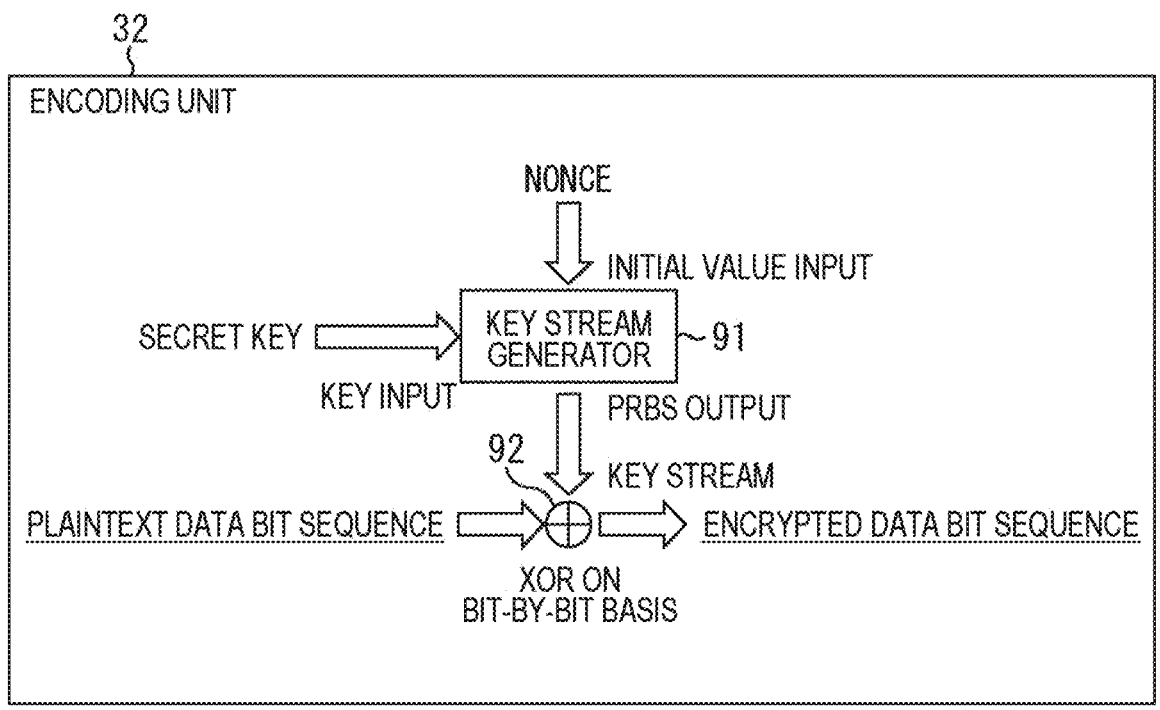
FIG. 2 is a diagram illustrating a configuration of a key stream generator in an encoding unit and a decoding unit of FIG. 1.

The encoding unit 32 of FIG. 2 includes a key stream generator 91 and an XOR processing unit 92.

The key stream generator 91 generates a pseudo-random number bit sequence (PRBS: Pseudo Random Binary Sequence) as a key stream from an initial value data (NONCE: Number used Once) and secret key data, and outputs the pseudo-random number bit sequence to the XOR processing unit 92.

Note that the initial value data (NONCE) is a numerical value which is different at every reset and is used only once.

The XOR processing unit 92 converts the plaintext data bit sequence into an encrypted data bit sequence by performing exclusive OR (XOR) processing on a bit-by-bit basis using a key stream on the plaintext data bit sequence including the Payload and the CMAC tag, and outputs the encrypted data bit sequence.

Note that the configuration similar as that of the key stream generator 91 is provided even in the decoding unit 52 of the IoT gateway 12, and the decoding unit 52 generates a key stream by using the same initial value data (NONCE: Number used Once) and the secret key data as that of the key stream generator 91 and performs exclusive OR (XOR) processing on the encrypted data bit sequence by using the generated key stream to decode the encrypted data bit sequence into a stream decoded data bit sequence.

<Reason to Use Key Stream>

Here, the reason why the stream encryption is used when generating the encrypted data bit sequence in the physical (PHY) layer will be described.

The types of encryption include block encryption which is performed in units of predetermined number of bits (block unit) and stream encryption performed in units of arbitrary number of bits.

Figure 3:
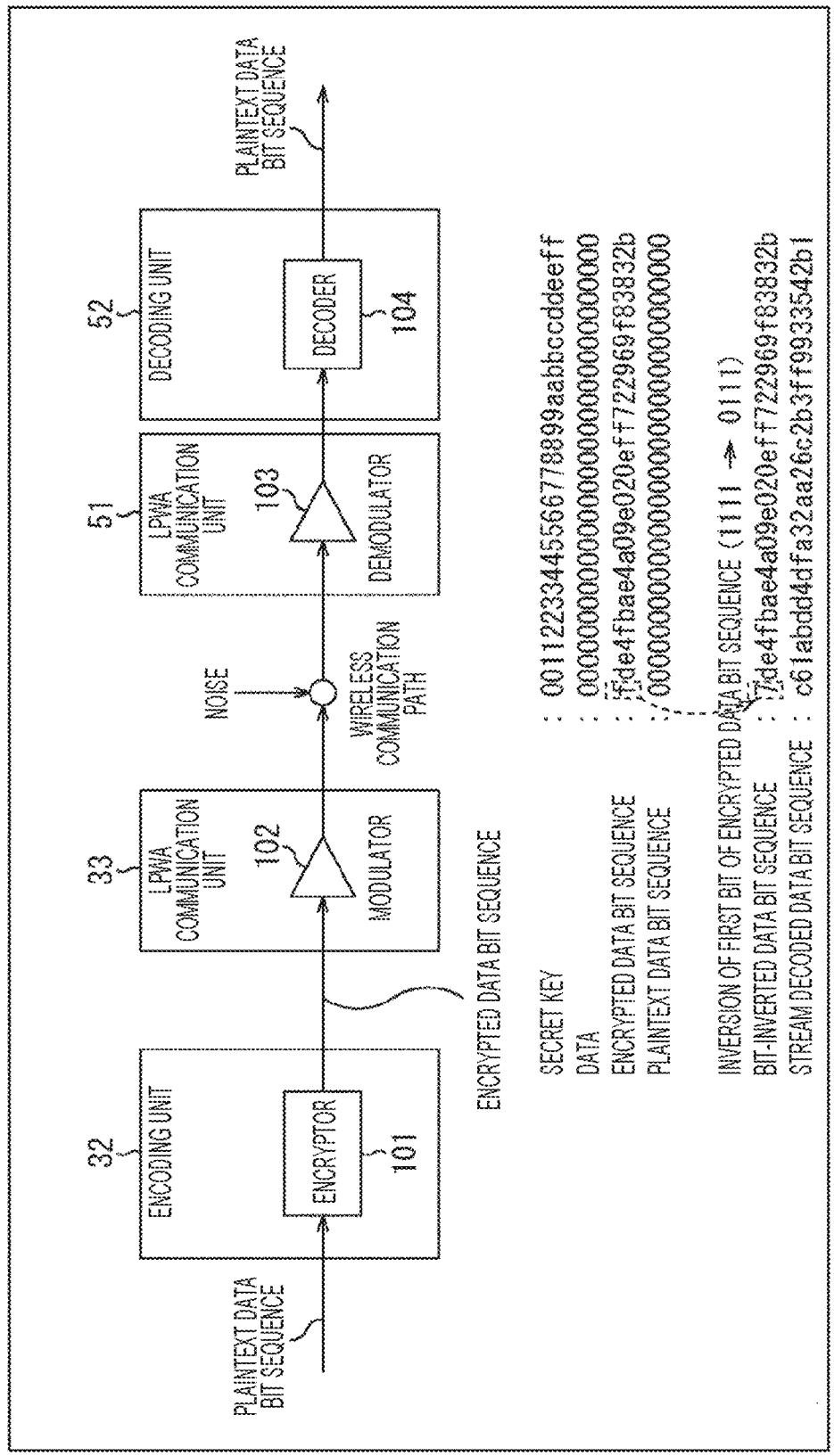
FIG. 3 is a diagram illustrating an effect of bit inversion caused by noise in block coding.

For example, as illustrated in the upper part of FIG. 3, a case is considered in which, instead of the key stream generator 91 and the XOR processing unit 92, the encoding unit 32 includes an encryptor 101 which encrypts in a predetermined bit unit (block unit) and is configured, for example, by an advanced encryption standard (AES) encryptor, and the corresponding decoding unit 52 is provided with a decoder 104 which decodes in block units.

Note that in FIG. 3, the plaintext data bit sequence is converted into the encrypted data bit sequence by the encryptor 101, and the encrypted data bit sequence is modulated into the transmission frame waveform signal by a modulator 102 of the LPWA communication unit 33 to be transmitted to the LPWA communication unit 51 of the IoT gateway 12 via a wireless communication path. Furthermore, in the LPWA communication unit 51, a demodulator 103 demodulates the transmitted transmission frame waveform signal into an encrypted data bit sequence and outputs the encrypted data bit sequence to the decoding unit 52.

In such a case, as illustrated in the lower part of FIG. 3, a case is considered in which the secret key is "00112233445566778899aabbccddeeff", the data is "00000000000000000000000000000000", and the encrypted data bit sequence is "fde4fbae4a09e020eff722969f83832b". In such a case, the decoded data bit sequence becomes "0000000000000000000000000000000" similarly to the data.

Here, noise is generated on the communication path, the noise causes, for example, the first bit of the encrypted data bit sequence surrounded by a dotted line to change from "f" (=binary number "1111") to "7" (binary number "0111") by bit inversion, and the encrypted data bit sequence becomes "7de4fbae4a09e020eff722969f83832b". In this case, this encrypted data bit sequence becomes "c61abdd4dfa32aa26c2b3ff9933542b1" when being converted into a stream decoded data bit sequence.

That is, in block encryption, the plaintext data bit sequence in the case of not being affected by noise is "0000000000000000000000000000000", whereas the first bit of the encrypted data bit sequence is only bit inverted due to the influence of noise, and the stream decoded data bit sequence is converted into a completely different decoded data bit sequence to become "c61abdd4dfa32aa26c2b3ff9933542b1". Thus, it becomes difficult to correct errors in the subsequent stage.

Figure 4:
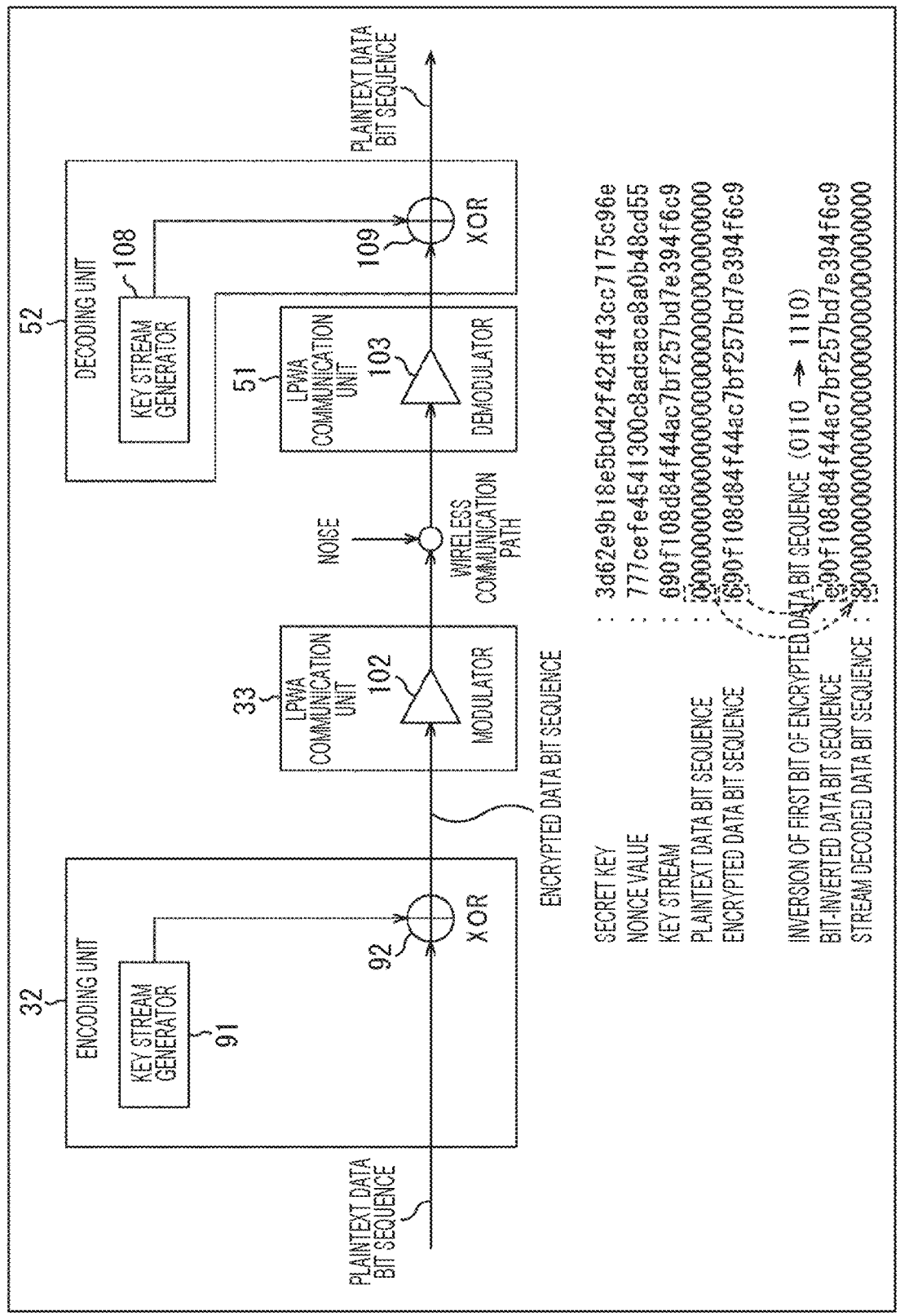
FIG. 4 is a diagram illustrating an effect of bit inversion caused by noise in stream coding.

On the other hand, as illustrated in the upper part of FIG. 4, a configuration is considered in which each of the encoding unit 32 and the decoding unit 52 is provided with the key stream generator 91 and the XOR processing unit 92 described with reference to FIG. 2.

Here, for example, a case is considered in which the secret key is "3d62e9b18e5b042f42df43cc7175c96e", a NONCE value is "777cefe4541300c8adcaca8a0b48cd55", the generated key stream is "690f108d84f44ac7bf257bd7e394f6c9", and the plaintext data bit sequence is "0000000000000000000000000000000". In this case, when the plaintext data bit sequence is stream-encrypted using the key stream, the encrypted data bit sequence becomes "690f108d84f44ac7bf257bd7e394f6c9". Here, in the wireless communication path, due to the influence of noise, for example, the first bit of the encrypted data bit sequence is bit-inverted to be "e" (binary number "1110") from "6" (=binary number "0110") as illustrated surrounded by a dotted line.

Due to the influence of this noise, the bit-inverted encrypted data bit sequence becomes "e90f108d84f44ac7bf257bd7e394f6c9", and the stream decoded data bit sequence decoded from this encrypted data bit sequence becomes "8000000000000000000000000000000".

That is, in the stream encryption, the plaintext data bit sequence is "0000000000000000000000000000000", whereas the stream decryption output affected by noise is "8000000000000000000000000000000", and only the first character is corrected from "8" to "0".

When the stream encryption is used for the block encryption in this way, the effect of errors due to noise becomes local, and thus the possibility of successful error correction increases.

Therefore, for such a reason, in the communication system of FIG. 1, it can be considered that the use of stream encryption has higher error tolerance than the use of block encryption.

<Replay Attack and Tampering Attack>

In the above-described LPWA communication, there is a possibility of being attacked by a malicious third party.

For example, a case is considered in which a transmission frame waveform signal Sign1 is transmitted from the IoT terminal 11 to the IoT gateway 12 by LPWA communication as illustrated in FIG. 3.

In this case, a communication device 111 operated by the malicious third party intercepts (captures) the transmission frame waveform signal Sign1, copies the captured transmission frame waveform signal to generate the transmission frame waveform signal Sign11, and repeatedly transmits the transmission frame waveform signals Sign11-1, Sign11-2, and so on to the IoT gateway 12.

By such an operation, the IoT gateway 12 repeatedly receives the transmission frame waveform signal Sign11 generated by copying the transmission frame waveform signal Sign1, so that it cannot be recognized that the received transmission frame waveform signal is forged, and the processing load increases to cause a service failure such as a decrease in operating speed. In this way, an attack which intercepts a transmission frame waveform signal by the physical (PHY) layer, copies the intercepted transmission frame waveform signal, and repeatedly transmits the intercepted transmission frame waveform signal is called a replay attack.

Furthermore, the communication device 111 operated by the malicious third party intercepts (captures) the transmission frame waveform signal Sign1, analyzes the format specifications, identifies the bits to be inverted, inverts the bits corresponding to a change in linear code such as CRC, generates a transmission frame waveform signal Sign12 configured by a tampered waveform obtained by inverting the polarity of the waveform portion corresponding to the inverted bit, and transmits the transmission frame waveform signal Sign12. In this way, an attack which generates and transmits a transmission frame waveform signal configured by of a tampered waveform obtained by inverting the polarity of the waveform portion corresponding to a predetermined bit is called a tampering attack.

Figure 6:
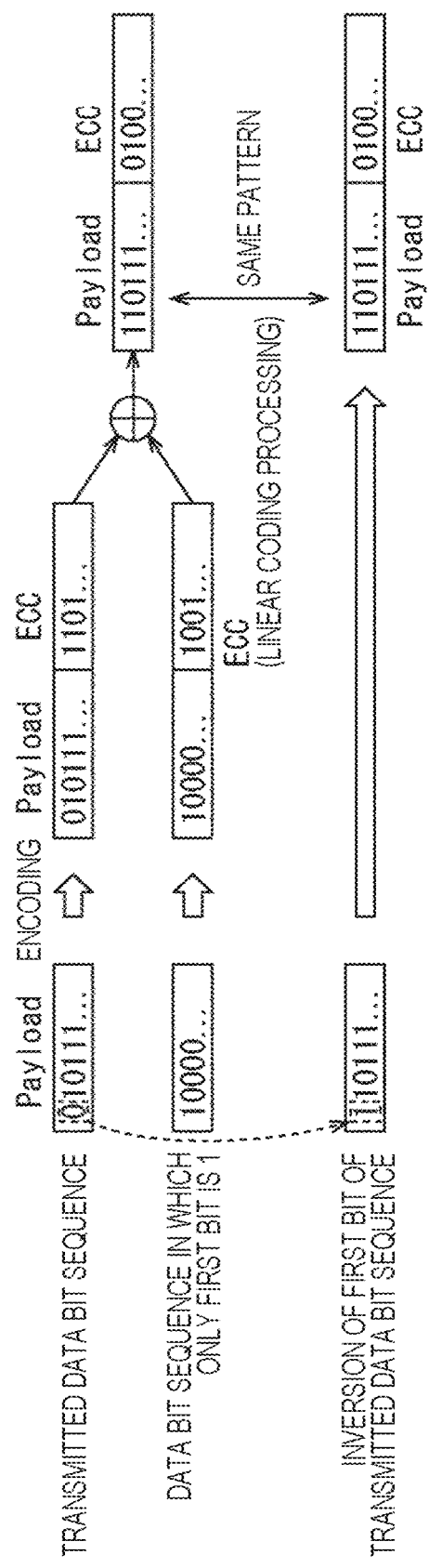
FIG. 6 is a diagram illustrating the tampering attack.

More specifically, for example, as illustrated in the upper right corner of FIG. 6, "010111 . . . " is assumed as the data bit sequence Payload to be transmitted. When this data bit sequence Payload "010111 . . . " is encoded, as illustrated in the upper center of FIG. 6, the data bit sequence Payload "010111 . . . " is added with "1101 . . . " as an error correcting code or error check and correct (ECC) including CRC, convolution codes, low density parity inspection codes, and the like by performing linear coding processing, so as to generate a data bit sequence "010111 . . . 1101 . . . ".

For example, in a case where the malicious third party analyzes the format specification of a data bit sequence and attempts to invert the first bit, as illustrated in the middle left of FIG. 6, the data bit sequence Payload "10000 . . . " which is a code word configured by a bit sequence in which only the first bit is "1" is encoded so as to generate the data bit sequence "100000 . . . 1001 . . . " by adding "1001 . . . " as an error correcting code or error check and correct (ECC) as illustrated in the middle center of FIG. 6.

At this time, when the data bit sequence "010111 . . . 1101 . . . " as a tampering target is added with the generated data bit sequence "100000 . . . 1001 . . . ", as illustrated in the upper right part of FIG. 6, a new data bit sequence configured by the data bit sequence "110111 . . . 0100 . . . " is generated.

Figure 5:
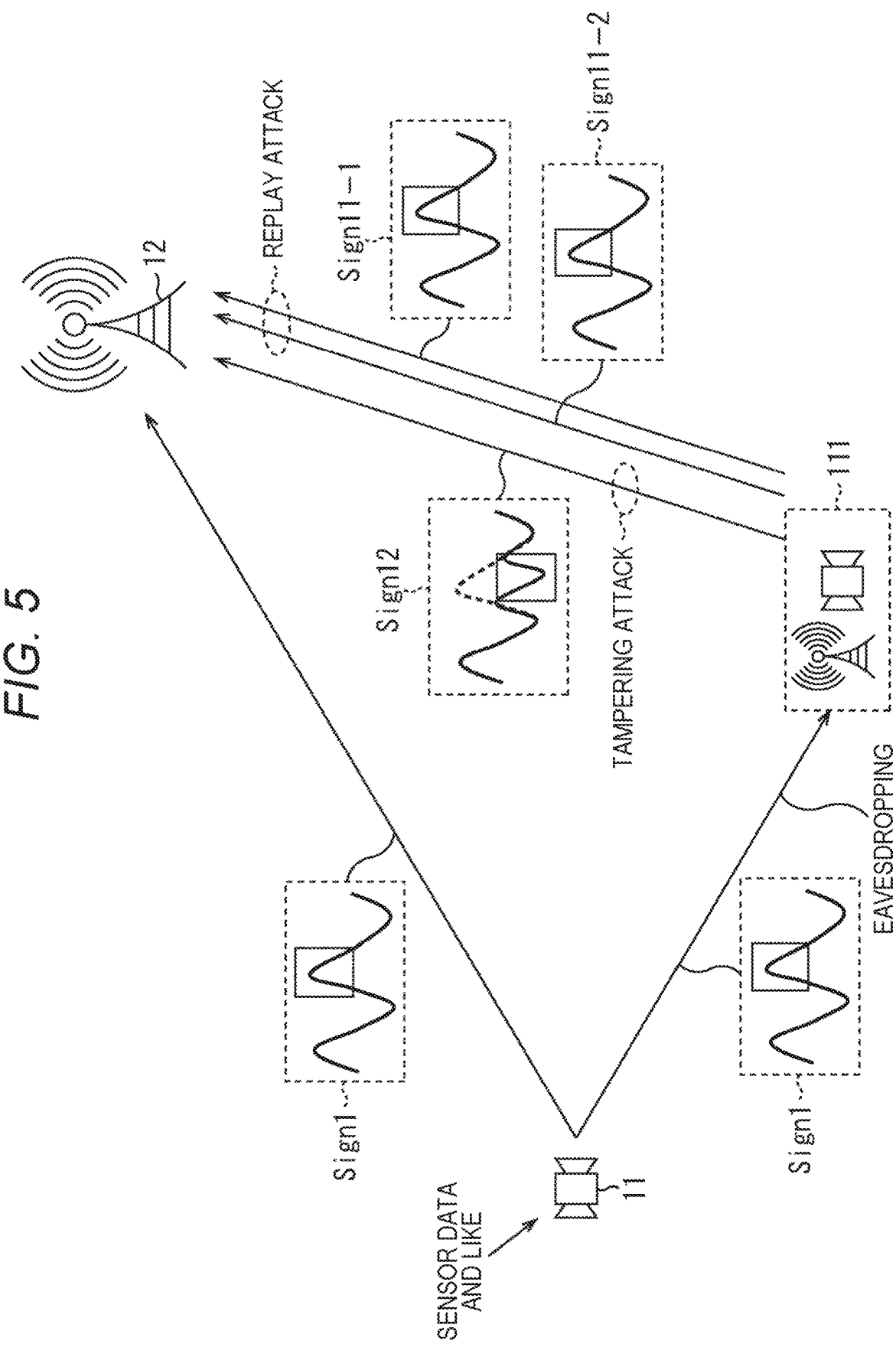
FIG. 5 is a diagram illustrating a replay attack and a tampering attack.

On the other hand, when the data bit sequence Payload "110111" obtained by inverting the first bit of the transmitted data bit sequence is generated as illustrated in the lower left part of FIG. 6 to be added with an error correcting code or error check and correct (ECC), the data bit sequence "110111 . . . 0100 . . . " can be generated as illustrated in the lower right part of FIG. 6. Since these data bit sequences are the same, the receiving side cannot determine whether the data has been tampered with or has not been tampered with, and thus there is a possibility of tampering attack by a tampered transmission frame waveform signal such as the transmission signal sign12 in FIG. 5.

However, the above-described tampering attack is caused by the fact that an error correcting code or error check and correct (ECC) is a linear operation, and it is possible to defend against the tampering attack by using CMAC.

However, the replay attack cannot be prevented by CMAC since the waveform synthesis method is used for reception processing.

It is conceivable to make defense measures against replay attacks by using a different transmission frame waveform for each transmission. However, when transmission information such as timing is included at the time of generating a CMAC tag, the transmission frame waveform signal is largely different for each transmission, and thus it is difficult to synthesize the waveform. In this way, in LPWA communication, it is not possible to make measures against the replay attack after defending against tampering attacks using CMAC.

In the communication system of the present disclosure, the confidentiality and communication resistance in low power wide area (LPWA) communication can be improved by realizing effective defense measures against the replay attack and the tampering attack.

<<2. Embodiment of the Present Disclosure>>

Next, a configuration example of the communication system of the present disclosure will be described with reference to FIG. 7.

A communication system 200 of the present disclosure is similar to the communication system 1 of FIG. 1 in a basic configuration. That is, the communication system 200 is configured by transmitting devices 201-1 to 201-n, receiving devices 202-1 to 202-m, and a cloud server 203.

The transmitting device 201 corresponds to the IoT terminal 11 of FIG. 1, and transmits sensor data detected by a sensor (not illustrated) to the cloud server 203 via the receiving device 202 by LPWA communication. Here, the transmitting device 201 acquires the GPS time information transmitted together with position information by a global positioning system (GPS), uses the information as NONCE together with the TXID which is a unique ID of the transmitting device 201 to generate a key stream, and uses this key stream to convert a plaintext data bit sequence into an encrypted data bit sequence.

The receiving device 202 has a configuration corresponding to the IoT gateway 12 of FIG. 1, receives the transmission signal transmitted from the transmitting device 201, and transmits the transmission signal to the cloud server 203. At this time, the receiving device 202 acquires the GPS time information transmitted together with position information by a global positioning system (GPS), generates a key stream together with the TXID of the transmitting device 201, and converts the encrypted data bit sequence into a stream decoded data bit sequence.

Note that the cloud server 203 is provided with application programs 211-1 to 211-p and is basically similar to the cloud server 13 in FIG. 1, and thus the description thereof will be omitted.

Figure 7:
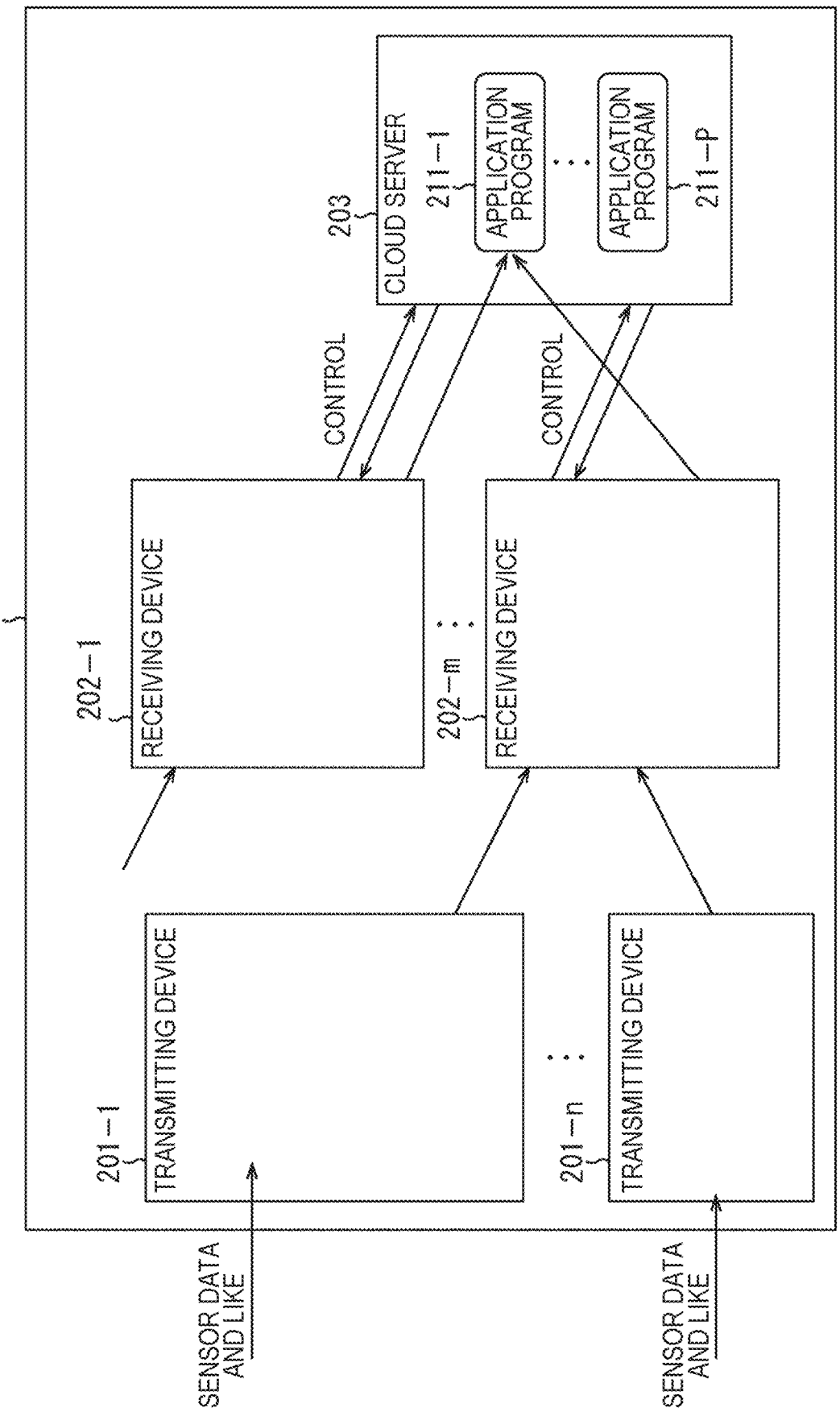
FIG. 7 is a diagram illustrating a configuration example of a communication system of the present disclosure.

That is, in the communication system 200 of FIG. 7, the key stream changes with each generation on the basis of the GPS time information, the plaintext data bit sequence is converted into an encrypted data bit sequence by using this changing key stream, and the transmission frame waveform signal generated by modulating the encrypted data bit sequence also changes with each transmission, which is an effective measure against the replay attack.

<Configuration Example of Transmitting Device>

Next, a configuration example of the transmitting device 201 will be described with reference to the block diagram of FIG. 8.

The transmitting device 201 is configured by a MAC encryption unit 221, an encoding unit 222, and an LPWA transmission unit 223. In the LPWA communication of the transmitting device 201, the MAC encryption unit 221 configures the MAC layer, and the encoding unit 222 and the LPWA transmission unit 223 configure a physical (PHY) layer which is a lower layer than the MAC layer.

The media access control (MAC) encryption unit 221 encrypts (MAC layer) the Payload configured by sensor data (not illustrated), generates a MAC service data unit (MSDU) configured by the data bit sequence which stores the encrypted data (or the unencrypted Payload data), generates a CMAC tag corresponding to the MSDU, and outputs the CMAC tag to the encoding unit 222.

More specifically, the MAC encryption unit 221 includes an MSDU generation unit 231 and a CMAC processing unit 232.

The MSDU generation unit 231 generates a MAC service data unit (MSDU) configured by a data bit sequence which stores Payload (or data obtained by encrypting (MAC layer) Payload) configured by sensor data (not illustrated) in the MAC layer higher than the physical (PHY) layer, outputs the MSDU to the CMAC processing unit 232, generates a CMAC tag by CMAC processing, and outputs the MSDU and the CMAC tag in a combined state to the encoding unit 222.

The cipher-based message authentication code (CMAC) processing unit 232 generates a CMAC tag from the MAC service data unit (MSDU) by message authentication code algorithm. The CMAC tag is used for authentication and data tampering detection during decoding. Similarly to a hash value, the CMAC tag has the property that the value differs greatly when the MSDU which is the original data is tampered with. Thus, the presence or absence of tampering can be determined by comparing the CMAC tag generated from the received data bit sequence and the received CMAC tag.

The encoding unit 222 encodes the MSDU and the CMAC tag together and outputs the code to the LPWA transmission unit 223.

More specifically, the encoding unit 222 includes an error correction code addition unit 251, an XOR processing unit 252, a key stream generator 253, a storage unit 254, a GPS time information acquisition unit 255, a synchronization pattern generation unit 256, and a switch 257.

The error correction code addition unit 251 generates an error correction code ECC which is a code for detecting and correcting an error on the basis of the MSDU and the CMAC tag, generates a data bit sequence called a physical layer service data unit (PSDU) by assigning the ECC to the MSDU and the CMAC tag, and outputs the data bit sequence to the XOR processing unit 252.

The key stream generator 253 reads the TXID which is a unique ID of the transmitting device 201 stored in advance in the storage unit 254, uses the TXID together with the time information supplied from the GPS time information acquisition unit 255 as NONCE, further uses the secret key to generate a key stream configured by the pseudo-random number bit sequence (PRBS: Pseudo Random Binary Sequence), and outputs the key stream to the XOR processing unit 252.

The storage unit 254 is configured by a memory or the like, stores the TXID which is a unique ID of the transmitting device 201 stored in advance, and supplies the TXID to the key stream generator 253.

The GPS time information acquisition unit 255 acquires GPS time information supplied when receiving satellite waves transmitted from satellites (not illustrated) and acquiring GPS position information, and supplies the GPS time information to the key stream generator 253.

The XOR processing unit 252 generates an encrypted data bit sequence by applying exclusive OR (XOR) processing on a bit-by-bit basis to the plaintext data bit sequence configured by the data bit sequence of the PSDU by using the key stream and outputs the encrypted data bit sequence to the switch 257.

The synchronization pattern generation unit 256 generates a synchronization pattern SYNC indicating a start position at the time of receiving the transmission frame signal to the receiving device 202 and outputs the synchronization pattern SYNC to the switch 257.

The switch 257 switches between the synchronization pattern SYNC supplied from the synchronization pattern generation unit 256 and the encrypted data bit sequence of the PSDU supplied from the XOR processing unit 252, generates a physical layer convergence protocol (PLCP) protocol data unit or a physical layer protocol data unit (PPDU), and outputs the PPDU to the LPWA transmission unit 223.

More specifically, the switch 257 is capable of switching the input on the basis of the transmission format, generates a PPDU which is an encoded signal configured by a synchronization pattern and an encrypted data bit sequence by switching between the bit output of the synchronization pattern SYMC supplied from the synchronization pattern generation unit 256 connected to a terminal 257a and the encrypted data bit sequence supplied from the XOR processing unit 252 connected to a terminal 257b, and outputs the PPDU to the LPWA transmission unit 223.

The LPWA transmission unit 223 generates a transmission frame waveform signal by modulating a PPDU in which the synchronization pattern SYNC and the encrypted data bit sequence of the PSDU are combined, and transmits the transmission frame waveform signal to the receiving device 202 by LPWA communication.

More specifically, the LPWA transmission unit 223 is configured by a modulator 271, a mixer 272, a local oscillator 273, a band pass filter (BPF) 274, an amplifier 275, and an antenna 276.

The modulator 271 modulates the PPDU which is an encoded signal, generates a transmission frame waveform signal, and outputs the transmission frame waveform signal to the mixer 272.

The mixer 272 synthesizes the local oscillation signal generated by the local oscillator 273 and the transmission frame waveform signal to generate a high frequency signal, and outputs the high frequency signal to the BPF 274.

The BPF 274 extracts a predetermined frequency band of signal from the high frequency signal by filtering and outputs the signal to the amplifier 275.

The amplifier 275 amplifies the predetermined frequency band of signal supplied from the BPF 274 at a predetermined magnification and transmits the signal to the receiving device 202 as a transmission frame waveform signal via the antenna 276.

Note that the transmitting device 201 repeatedly transmits different transmission frame waveform signals in different frequency bands four times by the above series of operations. Furthermore, an example will be described in which different transmission frame waveform signals are repeatedly transmitted four times in different frequency bands. However, the number of repetitions may be any other number as long as the number is two or more.

<Configuration Example of Receiving Device>

Next, a configuration example of the receiving device 202 will be described with reference to the block diagram of FIG. 9.

The receiving device 202 includes an LPWA reception unit 321, a decoding unit 322, and a MAC decoding unit 323. In the LPWA communication of the receiving device 202, the LPWA reception unit 321 and the decoding unit 322 configures a physical (PHY) layer, and the MAC decoding unit 323 configures a MAC layer which is a higher layer than the physical (PHY) layer.

The LPWA reception unit 321 receives a transmission frame waveform signal configured by the PPDU transmitted from the transmitting device 201 by LPWA communication by LPWA communication and outputs the synchronization pattern SYNC included in the PPDU of the transmission frame waveform signal and the encrypted data bit sequence of the PSDU to the decoding unit 322.

More specifically, the LPWA reception unit 321 includes an antenna 331, an amplifier 332, a mixer 333, a local oscillator 334, a BPF 335, a phase correction unit 336, and a synchronization detection unit 337.

The amplifier 332 receives the transmission frame waveform signal transmitted as a high frequency signal via the antenna 331, amplifies the waveform signal, and outputs the result to the mixer 333.

The mixer 333 converts the waveform signal into an intermediate frequency of waveform signal on the basis of a predetermined frequency band of waveform signal oscillated by the local oscillator 334 and outputs the waveform signal to the BPF 335.

The BPF 335 extracts the transmission frame waveform signal corresponding to the PPDU in a predetermined frequency band from the transmission frame waveform signals converted into the intermediate frequency, and outputs the waveform signal to the phase correction unit 336 and the synchronization detection unit 337.

The synchronization detection unit 337 detects the waveform signal of the synchronization pattern SYNC among the transmission frame waveform signals corresponding to the PPDU and outputs the waveform signal to the phase correction unit 336.

The phase correction unit 336 corrects the phase of the transmission frame waveform signal corresponding to the PPDU supplied from the BPF 335 at the timing when the synchronization pattern SYNC is detected by the synchronization detection unit 337, and outputs the waveform signal to the decoding unit 322.

The decoding unit 322 detects the position of the waveform signal corresponding to the PSDU on the basis of the waveform signal of the synchronization pattern SYNC, generates a key stream similarly to the transmitting device 201, restores the waveform signal corresponding to the encrypted data bit sequence, decodes the data bit sequence of the PSDU on the basis of the restored waveform signal, and outputs the data bit sequence to the MAC decoding unit 323.

More specifically, the decoding unit 322 includes a switch 351, a polarity inversion unit 352, a demodulator 353, an integrating unit 354, a decoder 355, a key stream generator 356, a storage unit 357, a GPS time information acquisition unit 358, and a synchronization signal waveform storage unit 359.

The switch 351 is controlled by the synchronization detection unit 337, separates the transmission frame waveform signal supplied from the LPWA reception unit 321, and outputs the waveform signal to the synchronization signal waveform storage unit 359 and the polarity inversion unit 352.

More specifically, the switch 351 is connected to the terminal 351a at the timing corresponding to the synchronization signal waveform among the waveform signals corresponding to the PPDU and outputs the waveform signal supplied from the LPWA reception unit 321 to the synchronization signal waveform storage unit 359. Then, at a timing other than the synchronization signal waveform, the switch 351 is connected to the terminal 351b and outputs the transmission frame waveform signal corresponding to the encrypted PSDU of the PPDU to the polarity inversion unit 352.

The polarity inversion unit 352 inverts the polarity of the waveform signal corresponding to the PSDU on the basis of the key stream supplied from the key stream generator 356 and outputs the result to the demodulator 353. Note that the operation of the polarity inversion unit 352 will be described in detail later with reference to FIGS. 11 and 12.

Furthermore, the key stream generator 356, the storage unit 357, and the GPS time information acquisition unit 358 have a configuration that includes functions corresponding to the key stream generator 253, the storage unit 254, and the GPS time information acquisition unit 255 of the transmitting device 201. Thus, the description thereof will be omitted.

The demodulator 353 demodulates the waveform signal output from the polarity inversion unit 352 and corresponding to the PSDU and outputs the result to the integrating unit 354 to integrate and store the result.

The integrating unit 354 integrates and stores the stream-decoded waveform signals corresponding to the same PSDU and outputs the integrated waveform signal of the PSDU to the decoder 355. Note that an example will be described here in which the transmission frame signals generated from the same PSDU is repeated four times in different frequency bands. However, the number of repetitions may be any other number as long as the number is two or more. Therefore, in this example, the addition result of the waveform signal of the PSDU integrated four times is output to the decoder 355.

The decoder 355 decodes the waveform signal which is stored in an integrated state in the integrating unit 354 and is added with the waveform signal demodulated four times, output from the polarity inversion unit 352, and corresponding to the PSDU. The decoder 355 generates a PSDU configured by the stream decoded data bit sequence corresponding to the encrypted data bit sequence and outputs the PSDU to the MAC decoding unit 323.

The MAC decoding unit 323 MAC-decodes the Payload corresponding to the sensor data transmitted from the transmitting device 201 on the basis of the stream decoded data bit sequence of the PSDU and outputs the result.

More specifically, the MAC decoding unit 323 includes an MSDU decoding unit 371 and a CMAC processing unit 372.

The MSDU decoding unit 371 corrects an error by using the error correction code ECC included in the PSDU, extracts the MSDU and the CMAC tag, decodes the Payload from the MSDU, and outputs the result to the CMAC processing unit 372.

The CMAC processing unit 372 generates a CMAC tag by CMAC processing on the basis of the MSDU and compares the CMAC tag with the CMAC tag added to the MSDU to determine the presence or absence of tampering depending on whether or not to match.

The MSDU decoding unit 371 outputs the Payload, which is the decoding result, together with the information on the presence or absence of tampering.

<Operation by Communication System in FIG. 7>

Figure 10:
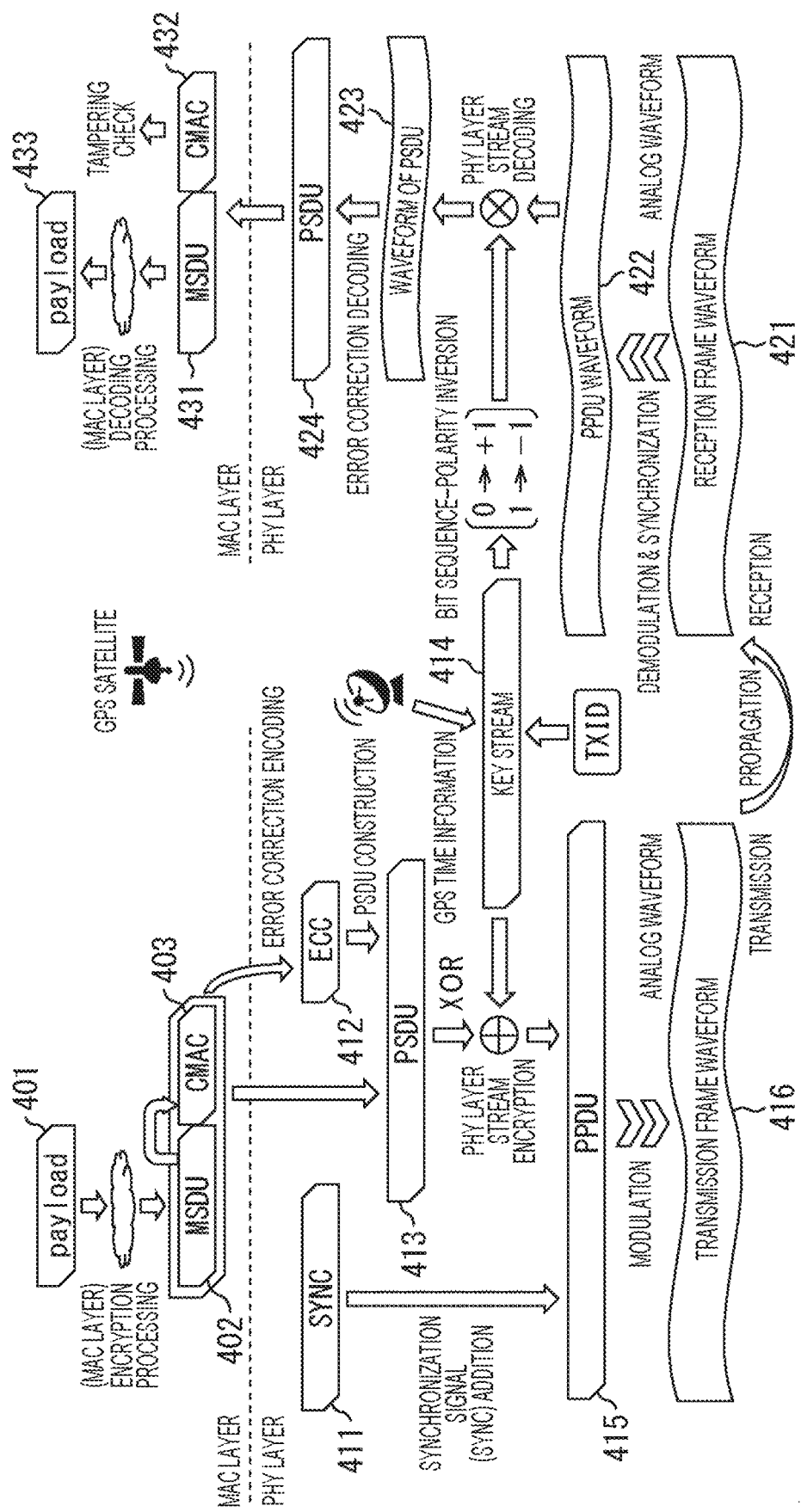
FIG. 10 is a diagram illustrating an operation by the communication system of FIG. 7.

Next, the operation of the communication system 200 of FIG. 7 will be described with reference to FIG. 10. Note that in FIG. 10, the left side in the drawing illustrates the flow of signals and waveforms generated by the operation of the transmitting device 201, and the right side in the drawing illustrates the flow of signals and waveforms generated by the operation of the receiving device 202.

First, the operation of the transmitting device 201 will be described from the upper left part in the drawing.

The MSDU generation unit 231 of the MAC encryption unit 221 in the transmitting device 201 encrypts payload 401 which is sensor data to generate the MSDU 402 and outputs the MSDU 402 to the CMAC processing unit 232.

The CMAC processing unit 232 performs CMAC processing on the MSDU 402, generates a CMAC tag 403 for determining the presence or absence of tampering, and outputs the CMAC tag 403 to the MSDU generation unit 231. The MSDU generation unit 231 adds the CMAC tag 403 to the generated MSDU 402 and outputs the result to the encoding unit 222.

Note that the process from the generation of the MSDU 402 to the addition of the CMAC tag 403 is the process of the MAC layer, and the subsequent process is the process of the physical (PHY) layer.

The error correction code addition unit 251 of the encoding unit 222 generates the error correction code ECC 412 from the information obtained by combining the MSDU 402 and the CMAC tag 403, and combines the error correction code ECC 412 with the information obtained by combining the MSDU 402 and the CMAC tag 403 to generate a PSDU 413.

Furthermore, the key stream generator 253 generates NONCE on the basis of the GPS time information TIME supplied from the GPS time information acquisition unit 255 and the TXID stored in the storage unit 254 and generates a key stream 414 together with a secret key to output the result to the XOR processing unit 252.

The XOR processing unit 252 performs XOR processing on the PSDU 413 which is the plaintext data bit sequence and the key stream 414 on a bit-by-bit basis by stream encryption processing in the physical (PHY) layer, converts the PSDU 413 into an encrypted data bit sequence, and outputs the encrypted data bit sequence to the switch 257.

The synchronization pattern generation unit 256 generates synchronization pattern SYNC 411 and outputs the synchronization pattern SYNC to the switch 257.

The switch 257 generates a PPDU 415 by adding the synchronization pattern SYNC 411 to the encrypted data bit sequence of the PSDU 413 and outputs the PPDU 415 to the LPWA transmission unit 223. More specifically, the switch 257 connects the bit output of the synchronization pattern SYNC 411 to the terminal 257a on the basis of the transmission format and receives the input of the synchronization pattern SYNC 411. Then, the switch 257 switches and is connected to the terminal 257b, receives the input of the encrypted data bit sequence of the PSDU 413 from the XOR processing unit 252, generates the PPDU 415 including the synchronization pattern SYNC 411, and outputs the PPDU 415 to the LPWA transmission unit 223.

In the LPWA transmission unit 223, the modulator 271 modulates the PPDU 415 to generate a transmission frame waveform 416. Then, the transmission frame waveform 416 is converted into a predetermined high frequency signal by the local oscillator 273 by the mixer 272, further extracts a predetermined frequency band by the BPF 274, is amplified by the amplifier 275, and is transmitted to the receiving device 202 by the antenna 276.

Hereinbefore, the operation of the transmitting device 201 has been described. Next, the operation of the receiving device 202 will be described from the lower right part in the drawing.

In the LPWA reception unit 321, a reception frame waveform 421 corresponding to the transmission frame waveform 416 is received via the antenna 331 and is amplified to a predetermined gain by the amplifier 332, and then is converted into an intermediate frequency on the basis of the predetermined frequency of signal supplied from the local oscillator 334 by the mixer 333 to be output to the BFP335.

The BPF 335 extracts a predetermined band of signal from the waveform signal of the reception frame waveform 421 converted into the intermediate frequency signal and outputs the signal to the phase correction unit 336 and the synchronization detection unit 337.

The synchronization detection unit 337 detects a waveform having a synchronization pattern in the reception frame waveform 421 and outputs the detected result to the phase correction unit 336.

The phase correction unit 336 corrects the phase of the reception frame waveform 421 from the timing when the synchronization pattern detected by the synchronization detection unit 337 is detected, and outputs the result as the PPDU waveform 422 to the decoding unit 322.

In the decoding unit 322, the switch 351 is connected to the terminal 351a and outputs the waveform signal of the PPDU waveform 422 input from the LPWA reception unit 321 to the synchronization signal waveform storage unit 359. When detecting a waveform other than the synchronization signal waveform from the input PPDU waveform 422, the synchronization detection unit 337 controls the switch 351 to be connected to the terminal 351b. With this operation, the switch 351 outputs the waveform of the PSDU position corresponding to the encrypted data bit sequence in the PPDU waveform 422 to the polarity inversion unit 352.

Furthermore, the key stream generator 356 generates NONCE on the basis of the GPS time information TIME supplied from the GPS time information acquisition unit 358 and the TXID stored in the storage unit 357 and generates the key stream 414 (the same key stream as the key stream generated by the key stream generator 253 of the transmitting device 201) with a secret key to output the result to the polarity inversion unit 352.

The polarity inversion unit 352 converts the PPDU waveform 422 into the waveform 423 of the PSDU by inverting the polarity of the waveform of the PSDU position corresponding to the encrypted data bit sequence in the PPDU waveform 422 on the basis of the key stream, and outputs the result to the demodulator 353.

Note that the operation of the polarity inversion unit 352 will be described in detail later with reference to FIGS. 11 and 12.

The demodulator 353 demodulates the waveform 423 of the PSDU corresponding to the stream-decoded data bit sequence, and integrates and stores the result in the integrating unit 354.

By using the error correction code ECC, the decoder 355 corrects an error from the waveform 423 of the PSDU corresponding to the stream-decoded data bit sequence integrated and stored in the integrating unit 354 for a predetermined number of times, decodes the PSDU 424 (corresponding to the PSDU 413), and outputs the result to the MAC decoding unit 323.

In the MAC decoding unit 323, the MSDU decoding unit 371 extracts an MSDU 431 and a CMAC tag 432 from the PSDU 424 and outputs the MSDU 431 and the CMAC tag 432 to the CMAC processing unit 372.

The CMAC processing unit 372 generate a CMAC tag by performing CMAC processing on the extracted MSDU 431, compares the CMAC tag with the CMAC tag 432 to determine whether or not the MSDU 431 has been tampered with, and outputs the determination result to the MSDU decoding unit 371.

The MSDU decoding unit 371 decodes the MSDU 431, generates a Payload 433, and outputs the Payload 433 together with information indicating whether or not the MSDU 431 has been tampered with.

The transmission frame waveform and the reception frame waveform which are PPDU waveforms transmitted and received by the LPWA communication between the transmitting device 201 and the receiving device 202 are generated on the basis of the encrypted data bit sequence using the key stream generated on the basis of the GPS time information. As a result, the encrypted data bit sequence changes according to the time change, so that it is possible to defend against the replay attack.

Furthermore, the LPWA communication using the CMAC also can be realized, and thus it is possible to defend against the tampering attack.

Moreover, the communication adopting a stream encryption method using a key stream can be realized, and thus in a case where a block encryption method is adopted, it is possible to reduce the number of bits having errors when an error and the like occur. Thus, the error tolerance can be improved.

As a result, it is possible to defend against the replay attack while defending against the tampering attack by the CMAC, and it is possible to improve the confidentiality of communications. Furthermore, with the communication by the stream encryption method, it is possible to improve error tolerance as compared with a case where the block encryption is used.

<Operation of Polarity Inversion Unit>

Next, the operation of the polarity inversion unit 352 will be described with reference to FIGS. 11 and 12.

First, in describing the operation of the polarity inversion unit 352, the operations of the key stream generator 91 and the XOR processing unit 92 in the communication system 1 of FIG. 1 will be described with reference to FIG. 11.

Figure 11:
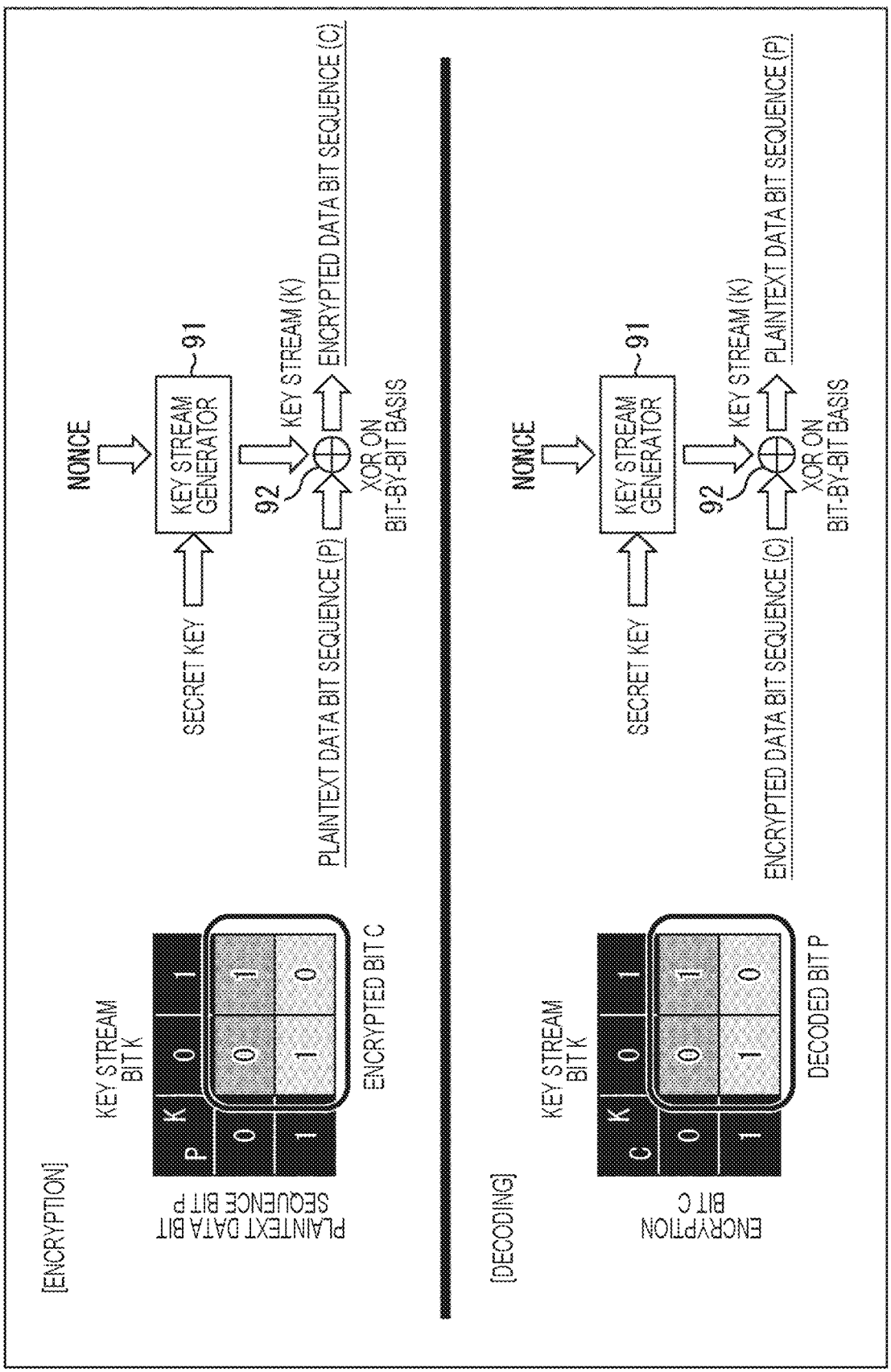
FIG. 11 is a diagram illustrating encryption and decryption operations in general stream encryption.

Generally, in stream encryption, as illustrated in the upper right part of FIG. 11, in a case where the key stream (K) is output from the key stream generator 91 of the encoding unit 32 of the IoT terminal 11, and the plaintext data bit sequence (P) of the PSDU is input, when each bit value of the plaintext data bit sequence (P) of the PSDU is set as P, and each bit value of the key stream (K) is set as K, the XOR processing unit 92 performs conversion into the encrypted data bit sequence C of the PSDU as illustrated in the upper left part of FIG. 11.

That is, when (P,K)=(0,0), (1,1), the XOR processing unit 92 converts the bit C of the encrypted data bit sequence (C) of the PSDU into 0, and when (P,K)=(1,0), (0,1), the XOR processing unit 92 converts the bit C of the encrypted data bit sequence (C) into 1.

On the other hand, at the time of decryption, as illustrated in the lower right part of FIG. 11, in a case where the key stream (K) is output from the key stream generator 91 of the decoding unit 52 of the IoT gateway 12, and the encrypted data bit sequence (C) of the PSDU is input, when each bit value of the encrypted data bit sequence (C) of the PSDU is set as C, and each bit value of the key stream (K) is set as K, the XOR processing unit 92 performs conversion into the stream decoded data bit sequence (P) of the PSDU as illustrated in the lower left part of FIG. 11.

That is, when (C,K)=(0,0), (1,1), the XOR processing unit 92 converts the bit P of the stream decoded data bit sequence (P) of the PSDU into 0, and when (C,K)=(1,0), (0,1), the XOR processing unit 92 converts the bit P of the stream decoded data bit sequence (P) into 1.

Figure 12:
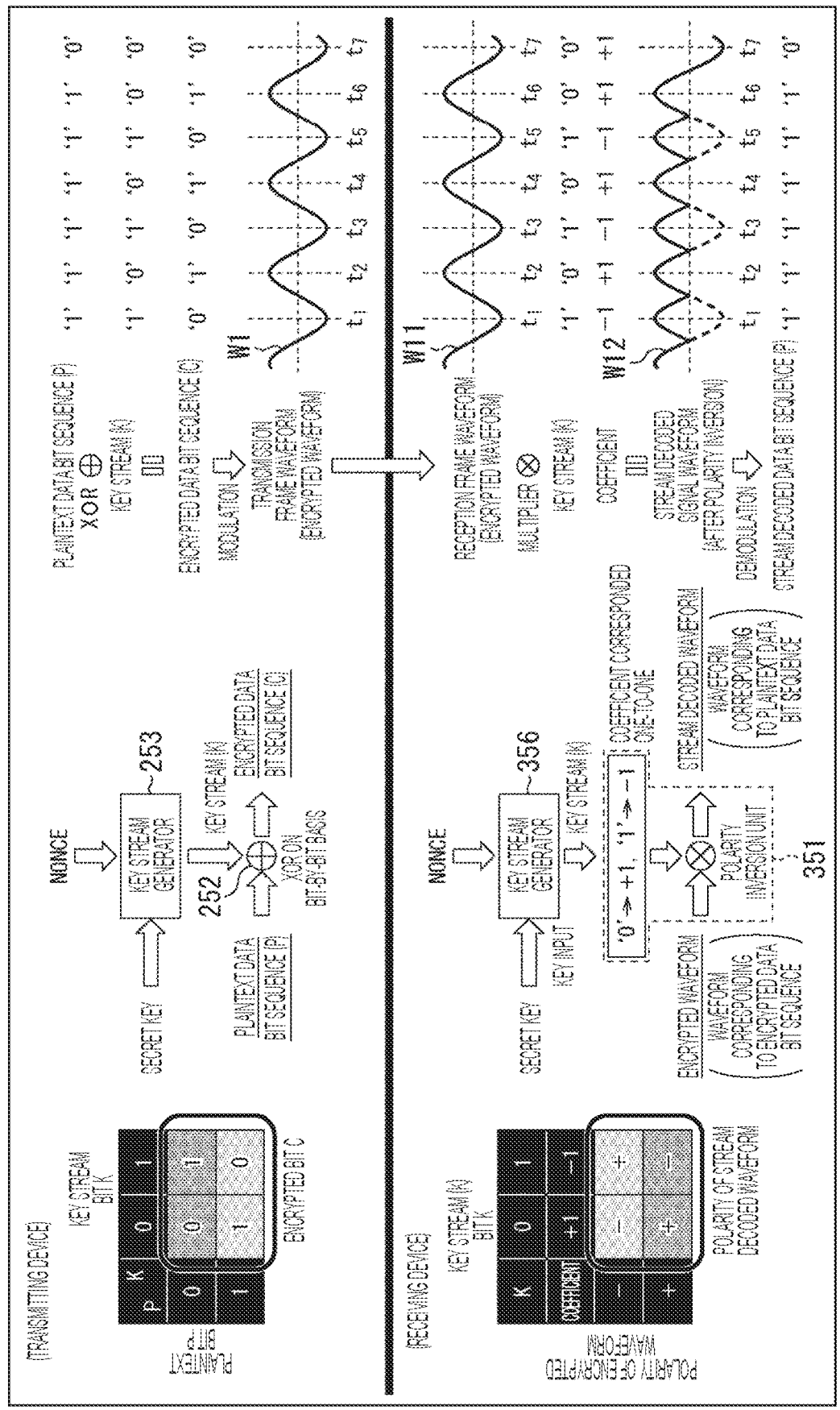
FIG. 12 is a diagram illustrating an operation of a polarity inversion unit in the receiving device of FIG. 7.

Furthermore, as illustrated in the upper left and upper center of FIG. 12, the operations of the key stream generator 253 and the XOR processing unit 252 of the transmitting device 201 of the communication system 200 of FIG. 7 are basically the same as the operations of the key stream generator 91 and the XOR processing unit 92 of the IoT terminal 11.

That is, all the above processing is performed on the digitized plaintext data bit sequence of the PSDU and the encrypted data bit sequence of the PSDU.

On the other hand, the processing in the polarity inversion unit 352 of the receiving device 202 is performed on the PSDU waveform signal (the waveform signal of the position of the PSDU among the waveform signals of the PPUD) among PPUD waveform signals (waveform signals in which PPUD is modulated) configured by analog signals.

That is, as illustrated in the lower center of FIG. 12, when the key stream (K) is output from the key stream generator 356 of the decoding unit 322 of the receiving device 202, in a case where the bit K of the key stream (K) is 0, +1 is given as a coefficient, and in a case where the bit K of the key stream (K) is 1, −1 is given as a coefficient.

Then, in a case where a waveform signal corresponding to the encrypted data bit sequence of the PSDU is input, the polarity inversion unit 352 functions as a multiplier and, as illustrated in the lower left part of FIG. 12, performs conversion into a decoded waveform corresponding to the stream decoded data bit sequence of the PSDU when the polarity is inverted by multiplying the polarity of each waveform of the waveform signal corresponding to the encrypted data bit sequence of the PSDU by a coefficient.

That is, when (K, coefficient, the polarity of the waveform of the waveform signal corresponding to the encrypted data bit sequence)=(0,+1,−), (1,−1,−), the polarity inversion unit 352 inverts the polarity of the encrypted waveform signal corresponding to the encrypted data bit sequence of the PSDU, and when (K, coefficient, the polarity of the waveform of the waveform signal corresponding to the encrypted data bit sequence)=(1,−1,+), (0,+1,+), the polarity inversion unit 352 does not invert the polarity.

Note that in the polarity of the waveform, the upwardly convex waveform is + and the downwardly convex waveform is −.

More specifically, for example, as illustrated in the upper right corner of FIG. 12, a case is considered in which the plaintext data bit sequence (P) of the PSDU configured by "1111110" is input. Note that in FIG. 12, "1111110" is described as '1', '1', '1', '1', '1', '1', '0', but in the description in the specification, only """ and """ are added before the first character and after the last character.

Here, it is assumed that the key stream (K) configured by "1010100" is generated in the key stream generator 253.

In this case, the XOR processing unit 252 performs the exclusive OR (XOR) processing to generate the encrypted data bit sequence (C) configured by "0101010".

By modulating the encrypted data bit sequence (C) of the PSDU configured by this "0101010", the transmission frame waveform W1 is generated and transmitted. The transmission frame waveform W1 is modulated such that in the encrypted data bit sequence C of PSDU, '0' is a downwardly convex waveform, and '1' is an upwardly convex waveform.

That is, in the transmission frame waveform W1, the '0' of the encrypted data bit sequence C of the PSDU at the beginning time t1 is a downwardly convex waveform, the '1' of the encrypted data bit sequence C of the PSDU at time t2 is an upwardly convex waveform, and the '0' of the encrypted data bit sequence C of the PSDU at time t3 is a downwardly convex waveform. Furthermore, the '1' of the encrypted data bit sequence C of the PSDU at time t4 is an upwardly convex waveform, and the '0' of the encrypted data bit sequence C of the PSDU at time t5 is a downwardly convex waveform. Moreover, the '1' of the encrypted data bit sequence C of the PSDU at time t6 is an upwardly convex waveform, and the '0' of the encrypted data bit sequence C of the PSDU at time t7 is a downwardly convex waveform.

Next, as illustrated in the lower right part of FIG. 12, in the receiving device 202, the transmission frame waveform W1 is received as the reception frame waveform W11.

In this case, the key stream generator 356 generates the same key stream K configured by "1010100" as that of the key stream generator 253 of the transmitting device 201.

Here, as illustrated in the lower left part of FIG. 12, the polarity inversion unit 352 assigns a coefficient to each bit of the key stream (K) configured by "1010100" to generate −1,+1,−1,+1,−1,+1,+1 as a coefficient data bit sequence.

Then, the polarity inversion unit 352 generates a waveform of the position of the PSDU as a decoded signal waveform W12 from the coefficient data bit sequence and the reception frame waveform W11.

That is, at time t1, the bit K of the key stream (K) is '1', and thus when the polarity inversion unit 352 sets the coefficient to −1, the polarity becomes "+" since the polarity is "−" according to the downwardly convex waveform at time t1, the waveform becomes an upwardly convex waveform, and the polarity is inverted. Note that in the lower right part of FIG. 12, the waveform before the polarity is inverted is illustrated as a dotted line waveform, and at time t1, the upwardly convex waveform which is formed by inversion and indicated by a solid line is illustrated.

Furthermore, at time t2, the bit K of the key stream (K) is '0', and thus when the polarity inversion unit 352 sets the coefficient to +1, since the polarity is "+" according to the upwardly convex waveform at time t2, the polarity remains "+" without inversion of the polarity.

Moreover, at time t3, the bit K of the key stream (K) is '1', and thus when the polarity inversion unit 352 sets the coefficient to −1, the polarity is inverted since the polarity is "−" according to the downwardly convex waveform at time t3, the polarity becomes "+", and the waveform becomes an upwardly convex waveform.

Furthermore, at time t4, the bit K of the key stream (K) is '0', and thus when the polarity inversion unit 352 sets the coefficient to +1, since the polarity is "+" according to the upwardly convex waveform at time t4, the polarity remains "+" without inversion of the polarity.

Moreover, at time t5, the bit K of the key stream (K) is '1', and thus when the polarity inversion unit 352 sets the coefficient to −1, the polarity is inverted since the polarity is "−" according to the downwardly convex waveform at time t5, the polarity becomes "+", and the waveform becomes an upwardly convex waveform.

Furthermore, at time t6, the bit K of the key stream (K) is '0', and thus when the polarity inversion unit 352 sets the coefficient to +1, since the polarity is "+" according to the upwardly convex waveform at time t6, the polarity remains "+" without inversion of the polarity.

Moreover, at time t7, the bit K of the key stream (K) is '0', and thus when the polarity inversion unit 352 sets the coefficient to +1, since the polarity is "−" according to the downwardly convex waveform at time t7, the polarity remains "−" without inversion of the polarity.

By the above processing, the decoded signal waveform W12 is decoded from the reception frame waveform W11 corresponding to the encrypted data bit sequence C of the PSDU.

Thereafter, the stream decoded data bit sequence is obtained by performing the decoding processing on the basis of the waveform of the decoded signal waveform W12. That is, '111111' is decoded according to the upwardly convex waveform from time t1 to t6 in the decoded signal waveform W12, and '0' is decoded according to the downwardly convex waveform at time t7 so that the original PSDU of '1111110' is decoded.

That is, by the above processing, the transmitting device 201 generates a key stream different depending on the GPS time information, and the PSDU is encrypted by the stream encryption method. In the receiving device 202, the key stream is generated by the similar method to decode the encrypted PSDU so that it is possible to transmit the Payload by LPWA communication.

In the receiving device 202, in the physical (PHY) layer, the waveform signals of the encrypted PSDU configured by analog signals can be decoded by the key stream different depending on the GPS time information.

With the above processing, it is possible to realize the stream encryption using the polarity inversion of the waveform polarity in the physical (PHY) layer, and it is possible to defend against the replay attack with a low-cost and highly compatible method for communication. Furthermore, by combining with CMAC in the MAC layer above the physical layer (PHY), it is possible to realize a multi-layer defense against the replay attack and the tampering attack.

<Specific Communication Method Using Communication System>

Figure 13:
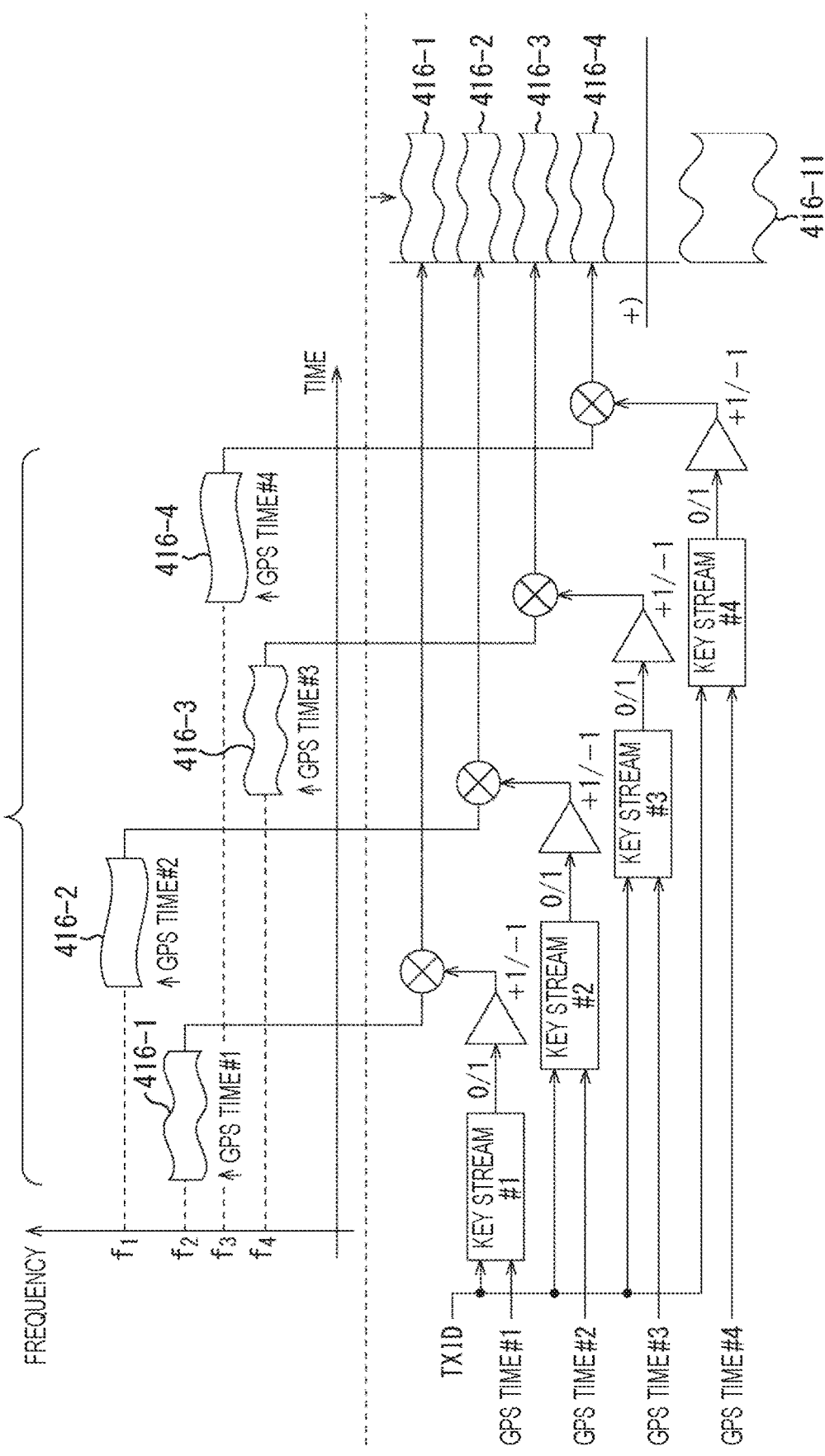
FIG. 13 is a diagram illustrating a waveform synthesis method by LPWA communication in the communication system of FIG. 7.

Next, a communication method by the LPWA communication by the communication system 200 including the transmitting device 201 and the receiving device 202 will be described with reference to FIG. 13.

In the present disclosure, the transmitting device 201 repeatedly transmits the same PSDU to the receiving device 202 at different frequencies with different transmission frame waveforms. Such PSDU transmission is referred to as burst transmission.

That is, as illustrated above the dotted line in FIG. 13, at the GPS time #1, the transmitting device 201 transmits a transmission frame waveform 416-1 in which the PSDU is encrypted with the key stream based on the GPS time #1 and the TXID to the transmitting device 201 at a frequency f2.

Furthermore, at the GPS time #2, the transmitting device 201 transmits a transmission frame waveform 416-2 in which the PSDU is encrypted with the key stream based on the GPS time #2 and the TXID to the transmitting device 201 at the frequency f1.

Moreover, at the GPS time #3, the transmitting device 201 transmits a transmission frame waveform 416-3 in which the PSDU is encrypted with the key stream based on the GPS time #3 and the TXID to the transmitting device 201 at the frequency f4.

Furthermore, at the GPS time #4, the transmitting device 201 transmits a transmission frame waveform 416-4 in which the PSDU is encrypted with the key stream based on the GPS time #4 and the TXID to the transmitting device 201 at the frequency f3.

Then, in the receiving device 202, as illustrated below the dotted line in FIG. 13, at the GPS time #1, the receiving device 202 performs the above-described polarity inversion processing on the signal waveform of the PSDU position from the transmission frame waveform 416-1 transmitted at the frequency f2 by the key stream based on the GPS time #1 and the TXID.

Furthermore, at the GPS time #2, the receiving device 202 performs the above-described polarity inversion processing on the signal waveform of the PSDU position from the transmission frame waveform 416-2 transmitted at the frequency f1 by the key stream based on the GPS time #2 and the TXID.

Moreover, at the GPS time #3, the receiving device 202 performs the above-described polarity inversion processing on the signal waveform of the PSDU position from the transmission frame waveform 416-3 transmitted at the frequency f4 by the key stream based on the GPS time #3 and the TXID.

Furthermore, at the GPS time #4, the receiving device 202 performs the above-described polarity inversion processing on the signal waveform of the PSDU position from the transmission frame waveform 416-4 transmitted at the frequency f3 by the key stream based on the GPS time #4 and the TXID.

Then, the receiving device 202 decodes the transmission frame waveform 416-11 obtained by adding (integrating) the signal waveforms of the four frames of PSDU demodulated from the transmission frame waveforms 416-1 to 416-4.

As described above, a different key stream is generated from different GPS time information at different transmission timings. Thus, each frame waveform transmitted by the stream encryption in the transmission processing has a different shape each time while each frame waveform can be made the same shape by stream (cryptographic) decryption in reception processing. Moreover, with this arrangement, on the receiving side, waveform synthesis which adds (integrates) waveforms becomes possible, and demodulation/decoding performance can be improved in addition to the resistance against the replay attack.

Furthermore, since the CMAC tag is also assigned to the signal waveform of the PSDU position which is repeatedly transmitted, it is possible to defend against the tampering attack.

As a result, it is possible to improve the demodulation/decoding performance while simultaneously defending against the replay attack and the tampering attack in multiple layers.

<Transmission Processing>

Figure 14:
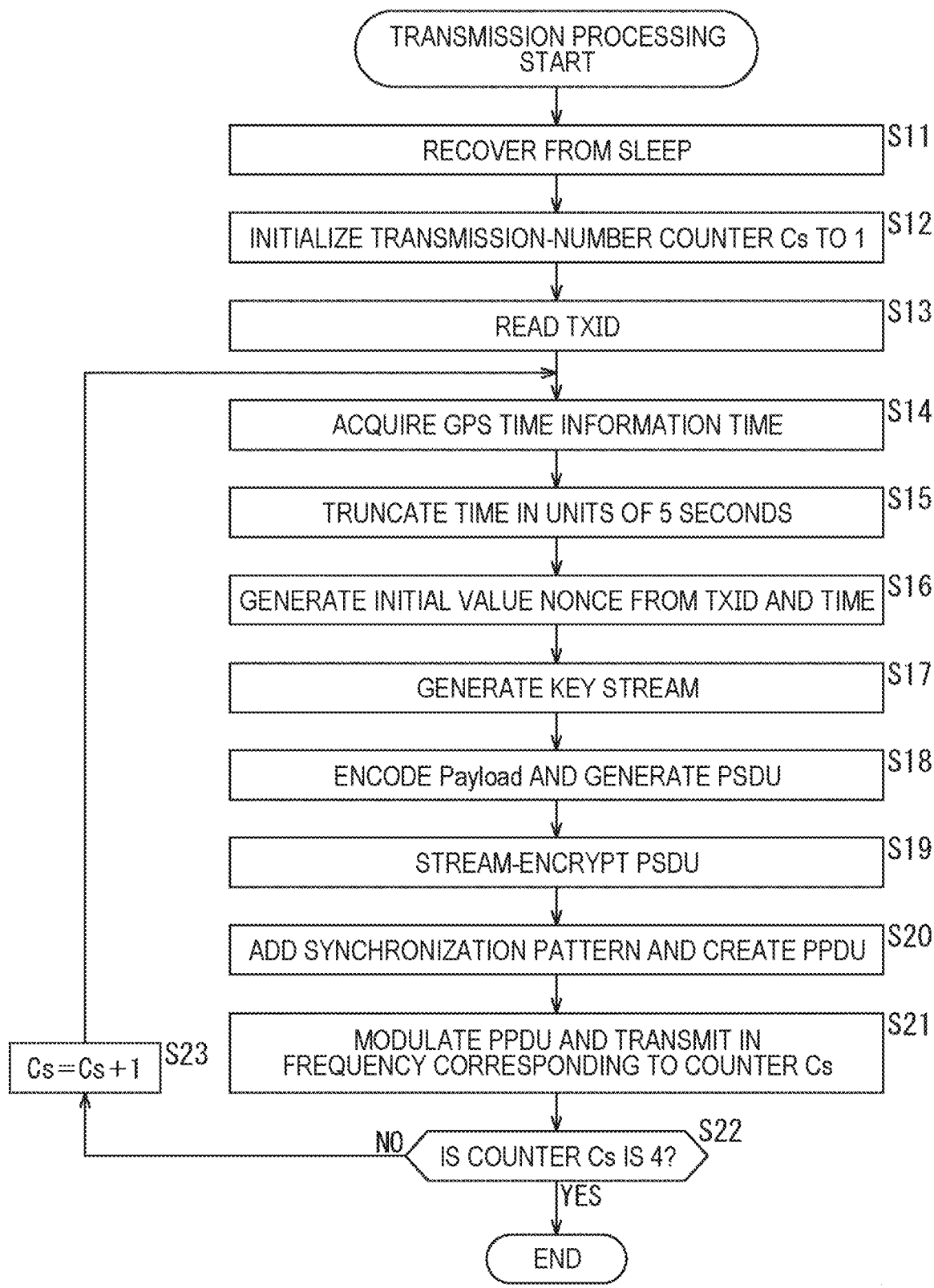
FIG. 14 is a flowchart illustrating an example of transmission processing by the transmitting device of FIG. 7.

Next, the transmission processing by the transmitting device 201 which transmits four frames per burst at intervals of five seconds will be described as an example with reference to the flowchart of FIG. 14.

In step S11, the transmitting device 201 is recovered from its own sleep state.

In step S12, the transmitting device 201 initializes a transmission-number counter Cs to one.

In step S13, the key stream generator 253 reads the TXID as an ID for identifying the transmitting device 201 stored in the storage unit 254.

In step S14, the key stream generator 253 acquires the GPS time information TIME supplied from the GPS time information acquisition unit 255.

In step S15, the key stream generator 253 truncates the acquired GPS time information TIME in units of five seconds. That is, in step S13, for example, in a case where the supplied GPS time information TIME is 00:15:21 (zero fifteen and twenty-one seconds), the GPS time information TIME is set to 00:15:20 (zero fifteen and twenty seconds) by truncating in units of five seconds.

In step S16, the key stream generator 253 generates the initial value NONCE of the key stream on the basis of the TXID and the GPS time information TIME.

In step S17, the key stream generator 253 generates a key stream on the basis of the initial value NONCE and the secret key and outputs the key stream to the XOR processing unit 252.

In step S18, encoding processing is performed on the Payload configured by the sensor data. More specifically, the MSDU generation unit 231 performs encryption processing on the Payload, generates an MSDU, and outputs the MSDU to the CMAC processing unit 232. The CMAC processing unit 232 performs CMAC processing on the MSDU to generate a CMAC tag and outputs the CMAC tag to the MSDU generation unit 231. The MSDU generation unit 231 combines the MSDU and the CMAC tag and outputs the result to the encoding unit 222. The error correction code addition unit 251 of the encoding unit 222 obtains and adds the error correction code ECC from the MSDU and the CMAC tag, generates a PSDU configured by a plaintext data bit sequence, and outputs the PSDU to the XOR processing unit 252.

In step S19, the XOR processing unit 252 stream-encrypts the PSDU configured by the plaintext data bit sequence by applying the exclusive OR (XOR) using each bit value of the key stream in bit units, converts the PSDU into a PSDU configured by an encrypted data bit sequence, and outputs the PSDU to the switch 257.

In step S20, the synchronization pattern generation unit 256 generates a synchronization pattern and outputs the synchronization pattern to the terminal 257a of the switch 257. Furthermore, the XOR processing unit 252 outputs the output encrypted data bit sequence to the terminal 257b. The switch 257 switches the input and outputs the result on the basis of the transmission format, generates a PPDU including the synchronization pattern and the encrypted data bit sequence, and outputs the PPDU to the LPWA transmission unit 223.

In step S21, the LPWA transmission unit 223 modulates the PPDU and transmits the result to the receiving device 202 in the frequency band corresponding to the counter Cs indicating the number of transmissions.

In step S22, the transmitting device 201 determines whether or not the counter Cs indicating the number of transmissions is four, and in a case where the number is not four, the process proceeds to step S23.

In step S23, the transmitting device 201 increments the counter Cs indicating the number of transmissions by one, and the process returns to step S14.

That is, the processes of steps S14 to S23 are repeated until the counter Cs becomes four, and the transmission frame waveform configured by the PPDU including the PSDU stream-encrypted by using the key stream based on the GPS time information corresponding to each transmission timing and the TXID is transmitted to the receiving device 202 at a frequency different depending on the counter Cs.

Then, in step S22, the counter Cs indicating the number of transmissions is considered as four, and the process ends when the transmission frame waveforms for four frames are transmitted.

<Reception Processing>

Figure 15:
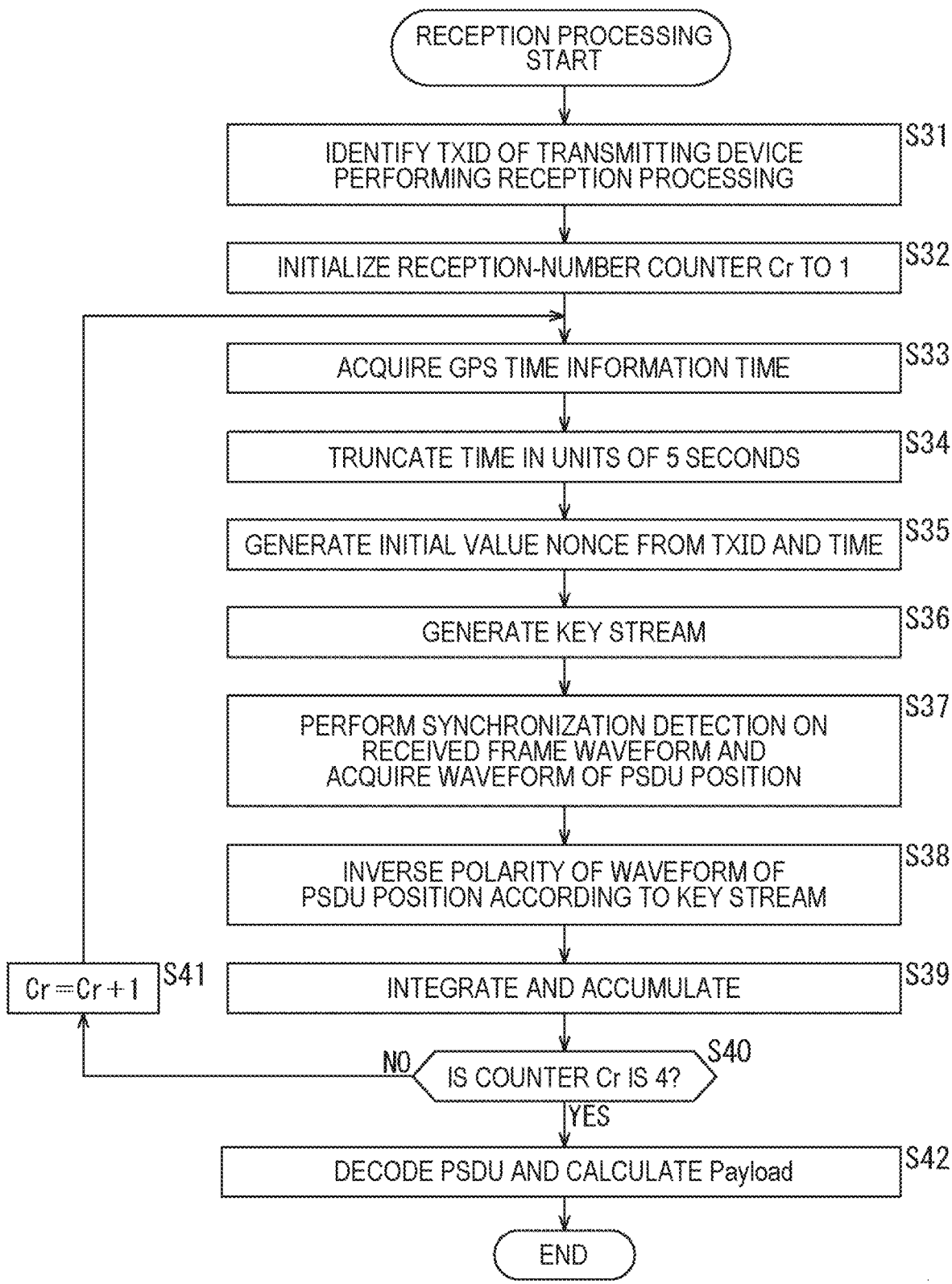
FIG. 15 is a flowchart illustrating an example of reception processing by the receiving device of FIG. 7.

Next, the reception processing by the receiving device 202 which transmits four frames per burst at intervals of five seconds will be described as a similar example with reference to the flowchart of FIG. 15.

In step S31, the key stream generator 356 identifies the TXID of the transmitting device 201 which is a reception processing target.

In step S32, the receiving device 202 initializes the reception-number counter Cr to one.

In step S33, the key stream generator 356 acquires the GPS time information TIME supplied from the GPS time information acquisition unit 358.

In step S34, the key stream generator 356 truncates the acquired GPS time information TIME in units of five seconds.

In step S35, the key stream generator 356 generates the initial value NONCE of the key stream on the basis of the TXID and the GPS time information TIME.

In step S36, the key stream generator 356 generates a key stream on the basis of the initial value NONCE and the secret key and outputs the key stream to the polarity inversion unit 352.

In step S37, the LPWA reception unit 321 receives the transmission frame waveform transmitted at a predetermined frequency as the reception frame waveform, performs synchronous detection, and outputs the result to the decoding unit 322. The decoding unit 322 acquires the waveform of the PSDU position.

More specifically, the amplifier 332 of the decoding unit 322 receives the transmission signal transmitted as a high frequency signal via the antenna 331, amplifies the waveform signal, and outputs the result to the mixer 333.

The mixer 333 converts the waveform signal into an intermediate frequency of waveform signal on the basis of a predetermined frequency band of waveform signal oscillated by the local oscillator 334 and outputs the waveform signal to the BPF 335.

The BPF 335 extracts a predetermined frequency band of waveform signal from the waveform signals converted to the intermediate frequency and outputs the waveform signal to the phase correction unit 336 and the synchronization detection unit 337.

The phase correction unit 336 corrects the phase of the waveform signal supplied from the BPF 335 at the timing when the synchronization pattern SYNC is detected by the synchronization detection unit 337, and outputs the waveform signal to the decoding unit 322.

The switch 351 of the decoding unit 322 receives the output of the phase correction unit 336 and separates the synchronization signal waveform and the signal waveform corresponding to the encrypted PSDU by the timing signal from the synchronization detection unit 337. The synchronization signal waveform storage unit 359 is connected to the end of the terminal 351a of the switch 351 to output the synchronization signal waveform, and the polarity inversion unit 352 is connected to the end of the terminal 351b to output the waveform signal of the PSDU position corresponding to the encrypted data bit sequence.

In step S38, as described with reference to FIG. 12, by using the key stream generated by the key stream generator 356 and inverting the polarity of the waveform signal of the PSDU position, the polarity inversion unit 352 performs stream decoding in the physical (PHY) layer, performs conversion into a PSDU waveform, and outputs the PSDU waveform to the demodulator 353.

In step S39, the demodulator 353 integrates and accumulates the waveform of the PSDU corresponding to the stream decoded data bit sequence with respect to the waveform accumulated in the integrating unit 354.

In step S40, the receiving device 202 determines whether or not the counter Cr indicating the number of receptions is four. In a case where the counter Cr is not four in step S38, the process proceeds to step S41.

In step S41, the counter Cr indicating the number of receptions is incremented by one, and the process returns to step S33.

That is, the processes of steps S33 to S41 are repeated until the transmission frame waveforms repeatedly transmitted at different frequencies are received for four frames.

Then, in step S40, the transmission frame waveforms for four frames are received, and in the integrating unit 354, the PSDU waveforms corresponding to the stream decoded data bit sequences for four times are added and accumulated. In a case where the counter Cr is determined to be four, the process proceeds to step S42.

In step S42, the decoder 355 corrects an error using the error correction code ECC on the basis of the integrated waveforms of the PSDU for four times accumulated in the integrating unit 354, then decodes the data bit sequence of the PSDU, and outputs the result to the MAC decoding unit 323.

Then, the MSDU decoding unit 371 of the MAC decoding unit 323 extracts the MSDU and the CMAC tag included in the PSDU, outputs the result to the CMAC processing unit 372, and decodes the Payload from the MSDU.

The CMAC processing unit 372 generates a CMAC tag by CMAC processing on the basis of the MSDU, compares the CMAC tag with the CMAC tag added to the MSDU to determine the presence or absence of tampering depending on whether or not to match, and outputs the determination result to the MSDU decoding unit 371.

The MSDU decoding unit 371 outputs the Payload, which is the decoding result, together with the information on the presence or absence of tampering.

With the above series of transmission processing and reception processing, the transmission frame waveform configured by the PPDU including the PSDU stream-encrypted by using the key stream based on the GPS time information corresponding to each transmission timing and the TXID is transmitted to the receiving device 202 at different frequencies.

With this processing, in the transmission frame waveform, the PPDU including the PSDU stream-encrypted using the key stream generated on the basis of the GPS time information different depending on the transmission timing and the TXID is transmitted as a different transmission frame waveform. Therefore, it is possible to defend against the replay attack. Furthermore, since the PSDU includes a CMAC, it is possible to defend against the tampering attack.

As a result, it becomes possible to realize a multi-layer defense of a replay attack measure in the physical (PHY) layer and a tampering attack measure in the MAC layer.

Furthermore, since the same PSDU is repeatedly transmitted, the receiving device 202 can perform decoding using the repeatedly transmitted integration result, so that the demodulation/decoding performance can be improved.

Note that in the above, the TXID and the GPS time information are used to generate the key stream used for each transmission frame waveform, but the same numerical values predetermined by the transmitting device 201 and the receiving device 202 may be included as additional information.

That is, by increasing the amount of information used as the NONCE, it is possible to improve the resistance against the replay attack.

Furthermore, in the above, the GPS time information is used for each transmission frame waveform. However, the key stream generated on the basis of the GPS time information may be used only for the first transmission frame, and the key stream of the subsequent transmission frame waveform may be generated by using the initial value obtained by the conversion process using the count value of the number of transmission frame waveforms for the first GPS time information.

That is, for example, in the first transmission frame, the key stream may be generated from the secret key, the TXID, the GPS time information, in the next transmission frame, the key stream may be generated in such a manner that the value of the counter corresponding to the elapsed time from the timing at which the first key stream is generated is added to the GPS time information used when the first key stream is generated, and in the subsequent transmission frames, the key stream may be generated similarly.

Moreover, in the above, an example is described in which the GPS time information truncated in units of five seconds is used as the NONCE. However, since it is sufficient if the transmission frame waveforms can be distinguished, for example, in a case where the transmission interval of the transmission frame waveforms is determined in units of milliseconds, the GPS time information in milliseconds according to the transmission interval may be used for the NONCE.

Furthermore, in the above, the GPS time information is used together with the TXID as the NONCE used to generate the key stream. However, other information may be used as long as the information changes according to the timing of generating the key stream. For example, time information such as universal time coordinated (UTC), Greenwich mean time (GMT), Japan standard time (JST) may be used, or the value of the counter which is counted at a predetermined time interval (which may be equal time intervals or non-equal time intervals) may be used.

Moreover, in the above, an example is described in which the transmission frame waveforms for four frames are set as one set for transmitting the same PSDU. However, when it is only required to transmit a plurality of transmission frame waveforms as one set to the same PSDU, the number of frames of the transmission frame waveforms for one set may be another number of frames as long as one set has two or more frames.

Furthermore, in the above, an example is described in which when the key stream is generated, the NONCE (initial value) is changed to generate the key stream together with the secret key. However, it is sufficient if the parameters required for generating the key stream are changed, and thus the NONCE (initial value) may be a fixed value while the secret key is changed each time the key stream is generated.

<<3. Application Example>>

In the above, an example is described in which in the receiving device 202, the key stream is generated by using the key stream generator based on the GPS time information and the TXID and used for a so-called stream encryptor.

However, the key stream generator can also be configured by combining a block cipher with a specific encryption utilization mode and may be used.

Figure 16:
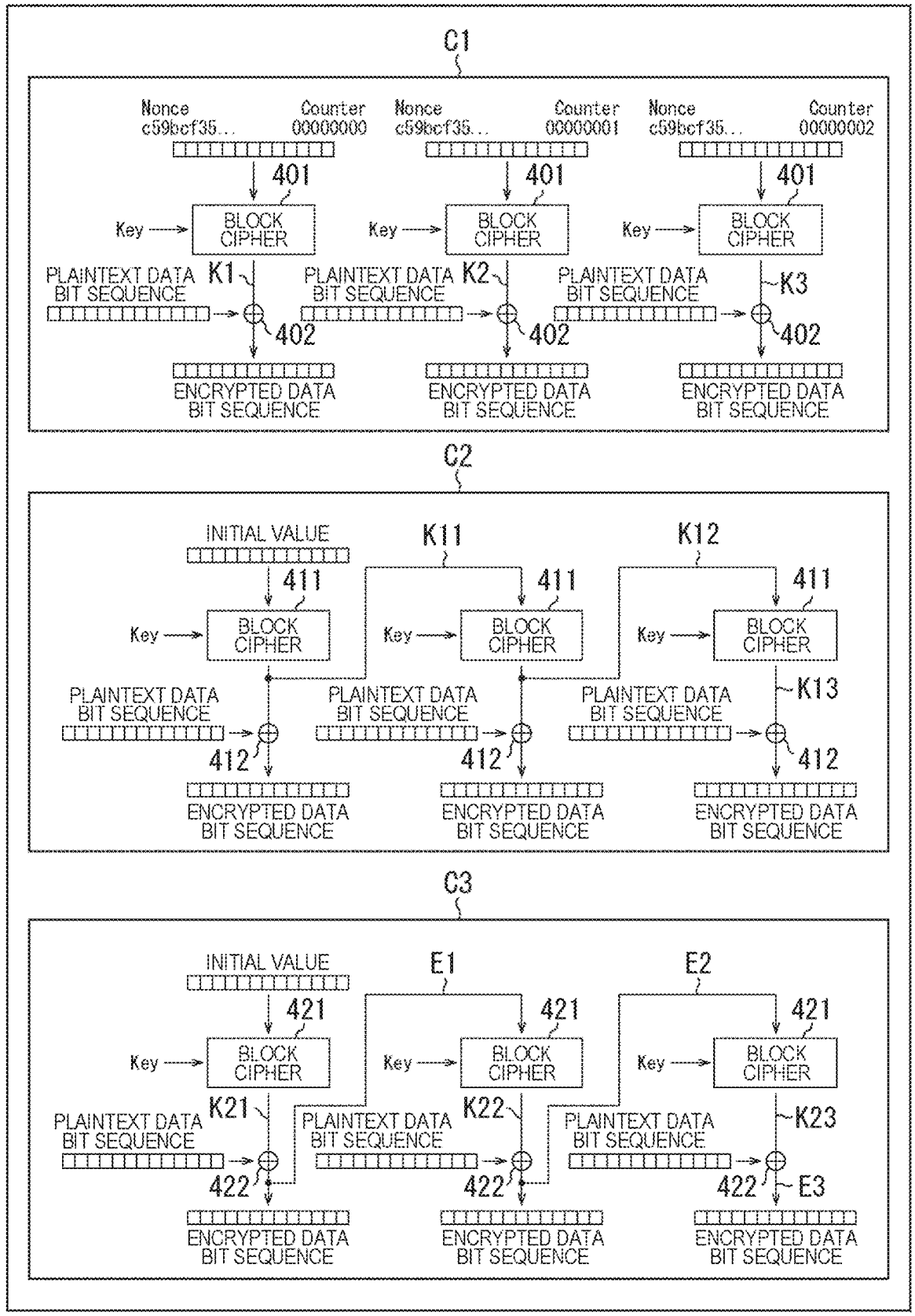
FIG. 16 is a diagram illustrating a configuration example of the key stream generator.

For example, as illustrated in case C1 of FIG. 16, the block cipher which increments the NONCE by a predetermined value each time the key stream is generated may be used.

That is, for example, at the first timing, a block cipher 401 generates a key stream K1 having a fixed number of bits by a NONCE configured by c59bcf35 . . . 00000000 and a secret key Key. An XOR processing unit 402 converts a plaintext data bit sequence into an encrypted data bit sequence by applying XOR on a bit-by-bit basis by using the key stream K1.

At the next timing, for example, the block cipher 401 generates a NONCE configured by c59bcf35 . . . 00000001 which is obtained by incrementing the immediately previous NONCE by one and generates a key stream K2 by using the NONCE together with the secret key Key. The XOR processing unit 402 converts a plaintext data bit sequence into an encrypted data bit sequence by applying XOR on a bit-by-bit basis by using the key stream K2.

Moreover, at the next timing, for example, the block cipher 401 generates a NONCE configured by c59bcf35 . . . 00000002 which is obtained by further incrementing the immediately previous NONCE by one and generates a key stream K3 by using the NONCE together with the secret key Key. The XOR processing unit 402 converts a plaintext data bit sequence into an encrypted data bit sequence by applying XOR on a bit-by-bit basis by using the key stream K3.

In this way, each time a key stream is generated, the key stream changes as the NONCE changes, and thus it is possible to defend against the replay attack.

Furthermore, as illustrated in case C2 of FIG. 16, an initial value to be the NONCE may be the key stream generated immediately before.

That is, for example, the block cipher 411 first generates a key stream K11 from the initial value and the secret key Key, and the XOR processing unit 412 converts a plaintext data bit sequence into an encrypted data bit sequence by applying XOR on a bit-by-bit basis by using the key stream K11.

At the next timing, for example, the block cipher 411 uses the immediately previous key stream K11 as an initial value and uses the key stream K11 together with the secret key Key to generate a key stream K12, and the XOR processing unit 412 converts a plaintext data bit sequence into an encrypted data bit sequence by applying XOR on a bit-by-bit basis by using the key stream K12.

Moreover, at the next timing, for example, the block cipher 411 uses the immediately previous key stream K12 as an initial value and uses the key stream K12 together with the secret key Key to generate a key stream K13, and the XOR processing unit 402 converts a plaintext data bit sequence into an encrypted data bit sequence by applying XOR on a bit-by-bit basis by using the key stream K13.

In this way, each time a key stream is generated, the key stream changes as the initial value changes, and thus it is possible to defend against the replay attack.

Moreover, as illustrated in case C3 of FIG. 16, an initial value to be the NONCE may be the encrypted data bit sequence generated immediately before.

That is, for example, the block cipher 411 first generates a key stream K21 from the initial value and the secret key Key. Then, the XOR processing unit 412 converts a plaintext data bit sequence into an encrypted data bit sequence E1 by applying XOR on a bit-by-bit basis by using the key stream.

At the next timing, for example, the block cipher 411 uses the immediately previous encrypted data bit sequence E1 as an initial value and uses the encrypted data bit sequence E1 together with the secret key Key to generate a key stream K22. Then, the XOR processing unit 412 converts a plaintext data bit sequence into an encrypted data bit sequence E2 by applying XOR on a bit-by-bit basis by using the key stream K22.

Moreover, at the next timing, for example, the block cipher 411 uses the immediately previous encrypted data bit sequence E2 as an initial value and uses the encrypted data bit sequence E2 together with the secret key Key to generate a key stream K23. Then, the XOR processing unit 402 converts a plaintext data bit sequence into an encrypted data bit sequence E3 by applying XOR on a bit-by-bit basis by using the key stream K23.

In this way, each time a key stream is generated, the key stream changes as the initial value changes, and thus it is possible to defend against the replay attack.

As described above, in the communication system of the present disclosure, the stream encryption in the physical (PHY) layer is used. Thus, in the receiving device, the waveform of the PSDU can be decoded by inverting the polarity of the transmission frame waveform, and each transmission frame waveform can be easily transformed into the same shape so that waveform synthesis becomes possible.

Furthermore, when the key stream is changed for every frame transmission on the basis of time, the transmission frame waveform is different every time. Thus, it is possible to improve the resistance against the replay attack, and even when the encrypted transmission waveform is different, it is possible to improve the demodulation/decoding performance by the waveform synthesis method.

Moreover, by stream encryption, a plaintext data bit sequence having arbitrary length can be converted into an encrypted data bit sequence.

<<4. Example of Execution by Software>>

By the way, the series of processes described above can be executed by hardware but can also be executed by software. In a case where the series of processes are executed by software, a program configuring the software is installed from a recording medium on a computer embedded in dedicated hardware or, for example, on a general-purpose computer or the like capable of executing various functions by installing various programs.

Figure 17:
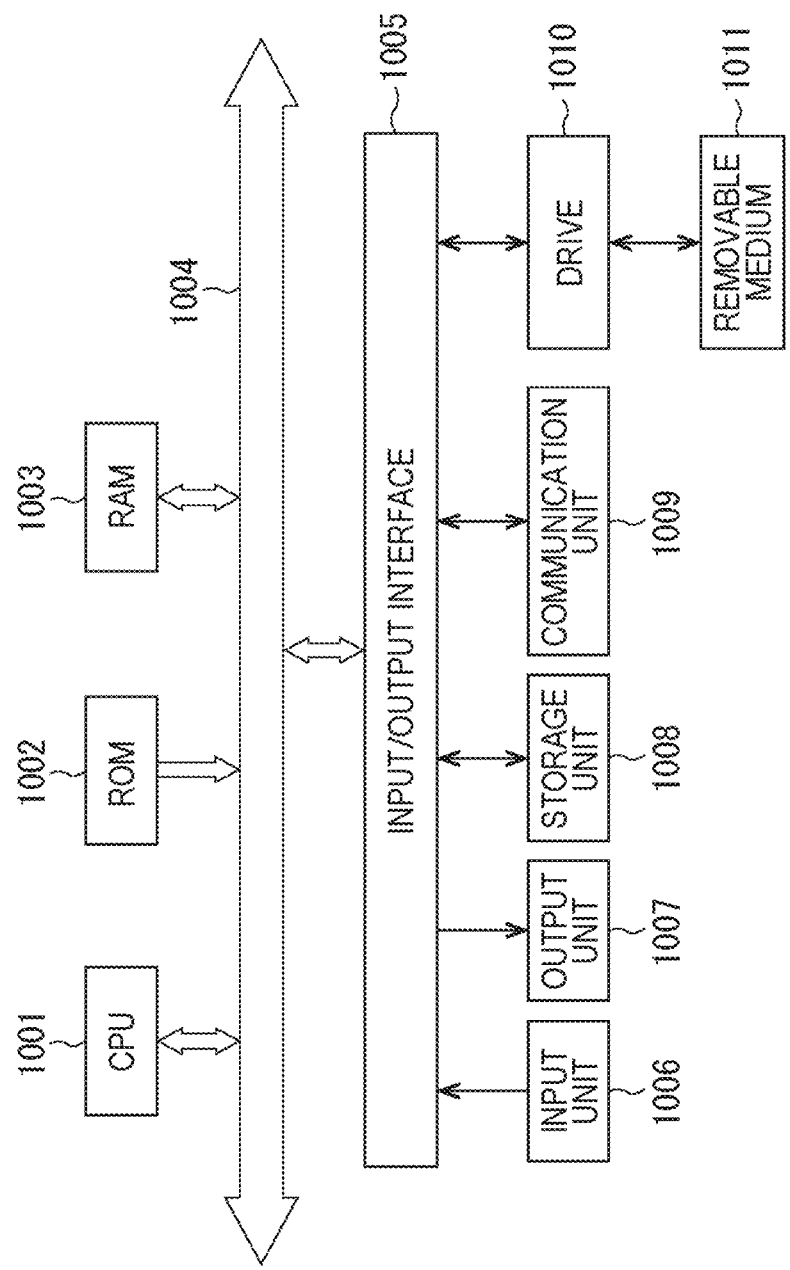
FIG. 17 is a diagram illustrating a configuration example of a general-purpose personal computer.

FIG. 17 illustrates a configuration example of the general-purpose computer. This personal computer has a built-in central processing unit (CPU) 1001. An input/output interface 1005 is connected to the CPU 1001 via a bus 1004. A read only memory (ROM) 1002 and a random access memory (RAM) 1003 are connected to the bus 1004.

The input/output interface 1005 is connected with an input unit 1006 configured by an input device such as a keyboard and a mouse for a user to input an operation command, an output unit 1007 which outputs a processing operation screen and an image of a processing result to a display device, a storage unit 1008 which includes a hard disk drive or the like for storing programs and various kinds of data, and a communication unit 1009 which includes a local area network (LAN) adapter or the like and executes communication processing via a network represented by the Internet. Furthermore, a drive 1010 which reads and writes data from and on a removable storage medium 1011 such as a magnetic disk (including a flexible disk), an optical disk (including a compact disc-read only memory (CD-ROM) and a digital versatile disc (DVD)), a magneto-optical disk (including a mini disc (MD)), and a semiconductor memory is connected.

The CPU 1001 executes various processes according to a program stored in the ROM 1002 or a program which is read from the removable storage medium 1011 such as a magnetic disk, an optical disk, a magneto-optical disk, or a semiconductor memory, is installed in the storage unit 1008, and is loaded from the storage unit 1008 into the RAM 1003. The RAM 1003 also appropriately stores data or the like necessary for the CPU 1001 to execute various processes.

In the computer configured as described above, the above-described series are performed, for example, in such a manner that the CPU 1001 loads the program stored in the storage unit 1008 into the RAM 1003 via the input/output interface 1005 and the bus 1004 and executes the program.

For example, the program executed by the computer (CPU 1001) can be recorded and provided on the removable storage medium 1011 as a package medium and the like. Furthermore, the program can be provided via a wired or wireless transmission medium such as a local area network, the Internet, or digital satellite broadcasting.

In the computer, the program can be installed in the storage unit 1008 via the input/output interface 1005 by mounting the removable storage medium 1011 in the drive 1010. Furthermore, the program can be received by the communication unit 1009 and installed in the storage unit 1008 via a wired or wireless transmission medium. In addition, the program can be installed in advance in the ROM 1002 or the storage unit 1008.

Note that the program executed by the computer may be a program in which processing is performed in time series in the order described in this specification or a program in which processing is performed in parallel or at a necessary timing such as when a call is made.

Figure 8:
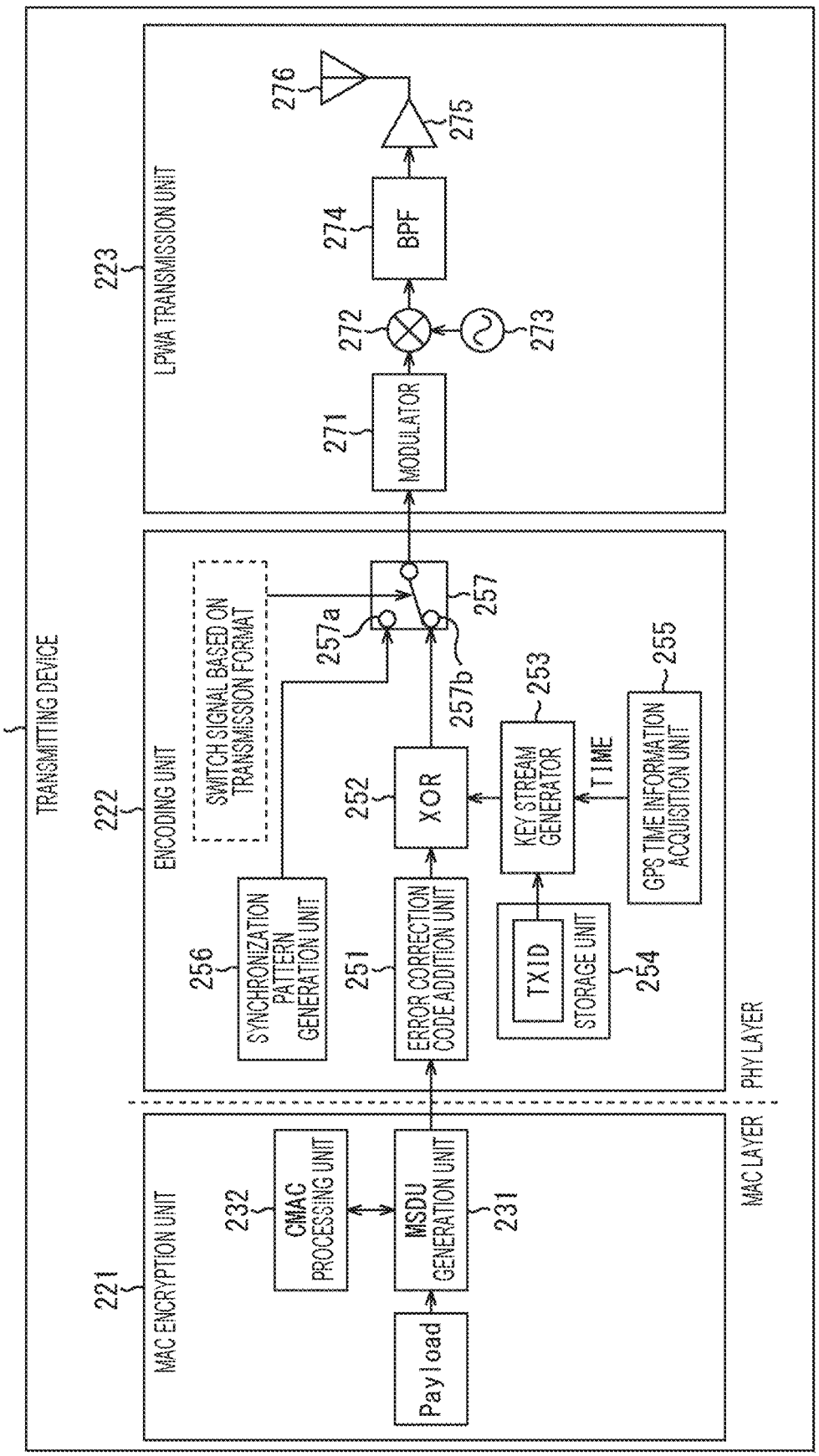
FIG. 8 is a diagram illustrating a configuration example of a transmitting device of FIG. 7.
Figure 9:
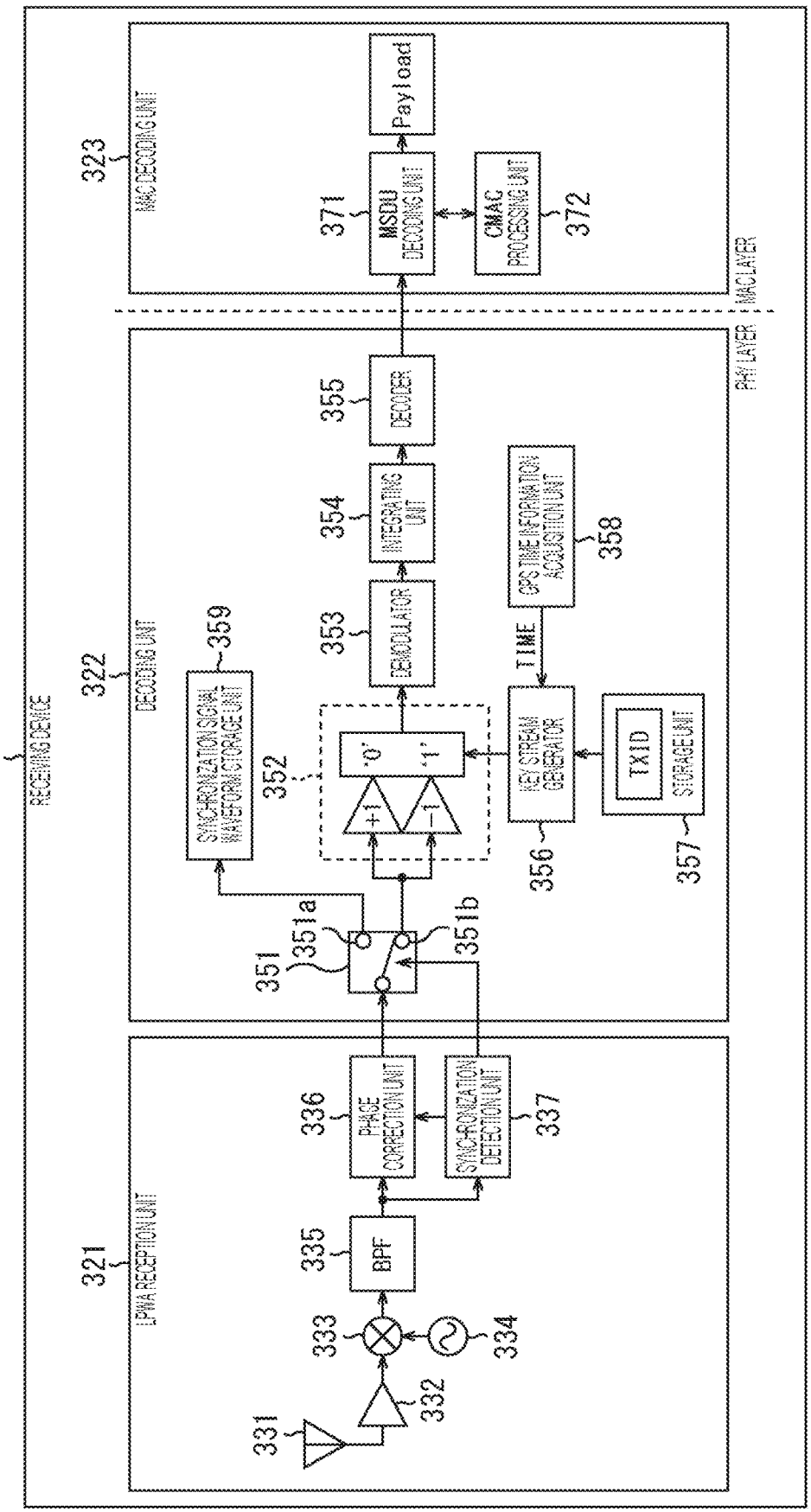
FIG. 9 is a diagram illustrating a configuration example of a receiving device of FIG. 7.

Note that the CPU 1001 in FIG. 17 realizes the functions of the encoding unit 222 in FIG. 8 and the decoding unit 322 in FIG. 9.

Furthermore, in this specification, the system means a set of a plurality of components (devices, modules (parts) and the like), and it does not matter whether or not all the components are in the same housing. Therefore, both a plurality of devices which is housed in separate housings and connected via a network and one device in which a plurality of modules is housed in one housing are systems.

Note that the embodiment of the present disclosure is not limited to the above-described embodiment, and various modifications can be made without departing from the scope of the present disclosure.

For example, the present disclosure can be configured as cloud computing in which one function is shared by a plurality of devices via a network and jointly processed.

Furthermore, each step described in the above-described flowcharts can be executed by one device or shared by a plurality of devices.

Moreover, in a case where one step includes a plurality of processes, the plurality of processes included in the one step can be executed by one device or shared by a plurality of devices.

Note that the present disclosure can also have the following configurations.

<1> A transmitting device including:
a key stream generation unit that generates a key stream by using information different depending on a timing as an initial value;
an encryption unit that converts transmitted data into encrypted data by using the key stream; and
a transmission unit that transmits a waveform signal obtained by modulating the encrypted data.

<2> The transmitting device according to <1> in which the information different depending on the timing is time information.

<3> The transmitting device according to <2> in which the time information includes global positioning system (GPS) time information, universal time coordinated (UTC) time information, Greenwich mean time (GMT), Japan standard time (JST) time information, and a value of a counter which is counted at predetermined equal time intervals or non-equal time intervals.

<4> The transmitting device according to <2> in which the key stream generation unit generates the key stream on the basis of information obtained by truncating the time information in a predetermined time unit.

<5> The transmitting device according to <2> in which the key stream generation unit generates the key stream by using, in addition to the time information, an ID unique to the transmitting device as the initial value and further using a secret key.

<6> The transmitting device according to <1> in which the information different depending on the timing is the key stream generated immediately before or the encrypted data generated immediately before.

<7> The transmitting device according to any one of <1> to <6>, further including:
an MSDU generation unit that generates a media access control (MAC) service data unit (MSDU) from Payload; and
a CMAC processing unit that generates a CMAC tag from the MSDU by cipher-based message authentication code (Cihper-based MAC: CMAC) processing, in which
the transmitted data includes the MSDU, the CMAC tag, and an error correcting code or error check and correct (ECC) generated from the MSDU and the CMAC tag.

<8> The transmitting device according to any one of <1> to <7> in which
the transmission unit repeatedly transmits the waveform signal obtained by modulating the encrypted data obtained by encrypting the same transmitted data at different timings.

<9> A transmitting method including:
a key stream generation process of generating a key stream by using information different depending on a timing as an initial value;
an encryption process of converting transmitted data into encrypted data by using the key stream; and
a transmission process of transmitting a waveform signal obtained by modulating the encrypted data.

<10> A receiving device including:
a reception unit that receives a waveform signal which is transmitted from a transmitting device and is obtained by modulating encrypted data obtained by encrypting transmitted data by a key stream generated by using information different depending on a timing as an initial value;
a key stream generation unit that generates a key stream by using the information different depending on the timing as an initial value;
a polarity inversion unit that inverts a polarity of a waveform of the waveform signal by the key stream; and a decoding unit that decodes the transmitted data on the basis of a waveform signal with the polarity inverted.

<11> The receiving device according to <10> in which the information different depending on the timing is time information.

<12> The receiving device according to <11> in which the time information includes global positioning system (GPS) time information, universal time coordinated (UTC) time information, Greenwich mean time (GMT), Japan standard time (JST) time information, and a value of a counter which is counted at predetermined equal time intervals or non-equal time intervals.

<13> The receiving device according to <11> in which the key stream generation unit generates the key stream on the basis of information obtained by truncating the time information in a predetermined time unit.

<14> The receiving device according to <11> in which the key stream generation unit generates the key stream by using, in addition to the time information, an ID unique to the transmitting device as the initial value and further using a secret key.

<15> The receiving device according to <10> in which the information different depending on the timing is the key stream generated immediately before or the encrypted data generated immediately before.

<16> The receiving device according to any one of <10> to <15> in which the transmitted data includes a media access control (MAC) service data unit (MSDU) generated on the basis of Payload, a CMAC tag generated from the MSDU by cipher-based message authentication code (Cihper-based MAC: CMAC) processing, and an error correcting code or error check and correct (ECC) obtained from the MSDU and the CMAC tag, the receiving device further including:

an MSDU decoding unit that decodes the MSDU and the CMAC tag from the transmitted data by performing error correction with the error correction code ECC; and a CMAC processing unit that generates a CMAC tag from the MSDU by cipher-based message authentication code (Cihper-based MAC: CMAC) processing and compares the CMAC tag with the CMAC tag decoded by the MSDU decoding unit to determine whether or not the transmitted data has been tampered with.

<17> The receiving device according to any one of <10> to <16> in which the reception unit receives a waveform signal which is repeatedly transmitted at different timings from the transmitting device and is obtained by modulating the encrypted data obtained by encrypting the same transmitted data.

<18> The receiving device according to <17>, further including:

an integration storage unit that integrates and stores a waveform in which a polarity of a waveform of the waveform signal which is repeatedly transmitted from the transmitting device and is obtained by modulating the encrypted data obtained by encrypting the same transmitted data is inverted by the key stream in the polarity inversion unit, in which the decoding unit decodes the transmitted data on the basis of the waveform signal which is integrated and stored in the integration storage unit and of which the polarity is inverted.

<19> The receiving device according to any one of <10> to <18> in which the polarity inversion unit inverts the polarity of the waveform of the waveform signal by multiplying the polarity of the waveform of the waveform signal by a coefficient set by the key stream.

<20> A receiving method including:

a reception process of receiving a waveform signal which is transmitted from a transmitting device and is obtained by modulating encrypted data obtained by encrypting transmitted data by a key stream generated by using information different depending on a timing as an initial value;

a key stream generation process of generating a key stream by using the information different depending on the timing as an initial value;

a polarity inversion process of inverting a polarity of a waveform of the waveform signal by the key stream; and a decoding process of decoding the transmitted data on the basis of a waveform signal with the polarity inverted.

REFERENCE SIGNS LIST

200 Communication system
201 Transmitting device
202 Receiving device
203 Cloud server
211, 211-1, 211-2 Application program
221 MAC encryption unit
222 Encoding unit
223 LPWA transmission unit
231 MSDU generation unit
232 CMAC processing unit
251 Error correction code addition unit
252 XOR processing unit
253 key stream generator
254 Storage unit
255 GPS time information acquisition unit
256 Synchronization pattern generation unit
257 Switch
257a, 257b Terminal
271 Modulator
272 Mixer
273 Local oscillator
274 BPF
275 Amplifier
276 Antenna
321 LPWA reception unit
322 Decoding unit
323 MAC decoding unit
331 Antenna
332 Amplifier
333 Mixer
334 Local oscillator
335 BPF
336 Phase correction unit
337 Synchronization detection unit
351 Switch
351a, 351b Terminal
352 Polarity inversion unit
353 Demodulator
354 Integrating unit
355 Multifunction machine
356 key stream generator
357 Storage unit
358 GPS time information acquisition unit
359 Synchronization signal waveform storage unit
371 MSDU generation unit
372 CMAC processing unit

The invention claimed is:

1. A transmitting device comprising:
a key stream generation circuit that generates a key stream by using information that differs depending on a timing as an initial value;
an encryption circuit that converts data to be transmitted into encrypted data by encrypting the data with the key stream;
a transmission circuit that transmits the data via a waveform signal obtained by modulating the encrypted data;
a media access control (MAC) service data unit (MSDU) generation circuit that generates a MDSU from a payload; and
a Cipher-based MAC (CMAC) processing circuit that generates a CMAC tag from the MSDU by CMAC processing,
wherein the transmitted data includes the MSDU, the CMAC tag, and an error correcting code (ECC) generated from the MSDU and the CMAC tag.

2. The transmitting device according to claim 1, wherein the information that differs depending on the timing is time information.

3. The transmitting device according to claim 2, wherein the time information includes global positioning system (GPS) time information, universal time coordinated (UTC) time information, Greenwich mean time (GMT), Japan standard time (JST) time information, or a value of a counter which is counted at predetermined equal time intervals or non-equal time intervals.

4. The transmitting device according to claim 2, wherein the key stream generation circuit generates the key stream on a basis of information obtained by truncating the time information in a predetermined time unit.

5. The transmitting device according to claim 2, wherein the key stream generation circuit generates the key stream by using, in addition to the time information, an ID unique to the transmitting device as the initial value and further using a secret key.

6. The transmitting device according to claim 1, wherein the information that differs depending on the timing is one of:
a key stream generated immediately before the key stream is generated, or
encrypted data that is generated immediately before the data to be transmitted is converted into the encrypted data.

7. The transmitting device according to claim 1, wherein the transmission circuit repeatedly transmits the waveform signal by modulating the same encrypted data to be transmitted at different timings.

8. A transmitting method comprising:
a key stream generation process of generating a key stream by using information that differs depending on a timing as an initial value;
an encryption process of converting data to be transmitted into encrypted data by encrypting the data with the key stream;
a transmission process of transmitting the data via a waveform signal obtained by modulating the encrypted data;
a media access control (MAC) service data unit (MSDU) generation process of generating a MDSU from a payload; and
a Cipher-based MAC (CMAC) process of generating a CMAC tag from the MSDU by CMAC processing,
wherein the transmitted data includes the MSDU, the CMAC tag, and an error correcting code (ECC) generated from the MSDU and the CMAC tag.

9. A receiving device comprising:
a reception circuit that receives data via a waveform signal which is transmitted from a transmitting device and that is produced by the transmitting device by modulating encrypted data obtained by encrypting the data, prior to transmission, with a key stream generated by using information that differs depending on a timing as an initial value;
a key stream generation circuit that generates the key stream by using the information that differs depending on the timing as the initial value;
a polarity inversion circuit that inverts a polarity of the waveform signal by the key stream;
a decoding circuit that decodes the transmitted data on a basis of the waveform signal with the polarity inverted,
wherein the transmitted data includes:
 a media access control (MAC) service data unit (MSDU) generated by the transmitting device on a basis of a payload,
 a Cipher-based MAC (CMAC) tag generated by the transmitting device from the MSDU by CMAC processing at the transmitting device, and
 an error correcting code (ECC) obtained by the transmitting device from the MSDU and the CMAC tag,
wherein the receiving device further comprises:
an MSDU decoding circuit that decodes the MSDU and the CMAC tag from the transmitted data by performing error correction with the ECC; and
a CMAC processing circuit that generates the CMAC tag from the MSDU by CMAC processing and compares the CMAC tag with the CMAC tag decoded by the MSDU decoding circuit to determine whether or not the transmitted data has been tampered with.

10. The receiving device according to claim 9, wherein the information that differs depending on the timing is time information.

11. The receiving device according to claim 10, wherein the time information includes global positioning system (GPS) time information, universal time coordinated (UTC) time information, Greenwich mean time (GMT), Japan standard time (JST) time information, or a value of a counter which is counted at predetermined equal time intervals or non-equal time intervals.

12. The receiving device according to claim 10, wherein the key stream generation circuit generates the key stream on a basis of information obtained by truncating the time information in a predetermined time unit.

13. The receiving device according to claim 10, wherein the key stream generation circuit generates the key stream by using, in addition to the time information, an ID unique to the transmitting device as the initial value and further using a secret key.

14. The receiving device according to claim 9, wherein the information that differs depending on the timing is one of:
a key stream generated immediately before the key stream is generated, or
encrypted data that is generated immediately before the data to be transmitted is converted into the encrypted data.

15. The receiving device according to claim 9, wherein the reception circuit receives the waveform signal which is repeatedly transmitted at different timings from the transmitting device and that is produced by the transmitting device by modulation the same encrypted data to be transmitted at the different timings.

16. The receiving device according to claim 15, further comprising:
an integration storage circuit that integrates and stores a waveform in which a polarity of the waveform signal, which is repeatedly transmitted from the transmitting device and that is produced by the transmitting device by modulating the same encrypted data to be transmitted at the different timings, is inverted by the key stream in the polarity inversion circuit, wherein
the decoding circuit decodes the transmitted data on a basis of the waveform signal which is integrated and store din the integration storage circuit and of which the polarity is inverted.

17. The receiving device according to claim 9, wherein the polarity inversion circuit inverts the polarity of the waveform signal by multiplying the polarity of the waveform signal by a coefficient set by the key stream.

18. A receiving method comprising:
a reception process of receiving a data via waveform signal which is transmitted from a transmitting device and that is produced by the transmitting device by modulating encrypted data obtained by encrypting the data, prior to transmission, with a key stream generated by using information that differs depending on a timing as an initial value;
a key stream generation process of generating the key stream by using the information that differs depending on the timing as the initial value;
a polarity inversion process of inverting a polarity of the waveform signal by the key stream; and
a decoding process of decoding the transmitted data on a basis of the waveform signal with the polarity inverted,
wherein the transmitted data includes:
a media access control (MAC) service data unit (MSDU) generated by the transmitting device on a basis of a payload,
a Cipher-based MAC (CMAC) tag generated by the transmitting device from the MSDU by CMAC processing at the transmitting device, and
an error correcting code (ECC) obtained by the transmitting device from the MSDU and the CMAC tag,
wherein the method further comprises:
an MSDU decoding process of decoding the MSDU and the CMAC tag from the transmitted data by performing error correction with the ECC; and
a CMAC process of generating the CMAC tag from the MSDU by CMAC processing and compares the CMAC tag with the CMAC tag decoded by the MSDU decoding circuit to determine whether or not the transmitted data has been tampered with.

* * * * *